United States Patent
Zotter et al.

(10) Patent No.: US 10,966,304 B2
(45) Date of Patent: *Mar. 30, 2021

(54) TWO-WIRE DIMMER WITH IMPROVED ZERO-CROSS DETECTION

(71) Applicant: Lutron Technology Company LLC, Coopersburg, PA (US)

(72) Inventors: William Zotter, Coopersburg, PA (US); Bingrui Yang, Cupertino, CA (US); Henry Kite, Cambridge (GB)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/808,050

(22) Filed: Mar. 3, 2020

(65) Prior Publication Data

US 2020/0205270 A1  Jun. 25, 2020

Related U.S. Application Data

(63) Continuation of application No. 15/493,345, filed on Apr. 21, 2017, now Pat. No. 10,602,593, which is a
(Continued)

(51) Int. Cl.
*H05B 47/16* (2020.01)
*H05B 39/08* (2006.01)
(Continued)

(52) U.S. Cl.
CPC .......... *H05B 47/16* (2020.01); *H05B 39/048* (2013.01); *H05B 39/08* (2013.01); *H05B 45/10* (2020.01);
(Continued)

(58) Field of Classification Search
CPC ........ H05B 47/10; H05B 47/16; H05B 45/10; H05B 45/14; H05B 45/37; H05B 39/048; H05B 39/09
(Continued)

(56) References Cited

U.S. PATENT DOCUMENTS 4,399,395 A   8/1983  Espelage
4,435,677 A   3/1984  Thomas et al.
(Continued)

FOREIGN PATENT DOCUMENTS

CN       1456027 A    11/2003
CN     102378445 A     3/2012
(Continued)

*Primary Examiner* — Amy Cohen Johnson
*Assistant Examiner* — Syed M Kaiser
(74) *Attorney, Agent, or Firm* — Condo Roccia Koptiw LLP

(57) ABSTRACT

A lighting device, such as a two-wire lighting control device, may include a controllably conductive device and a control circuit. The controllably conductive device may supply an AC line voltage to a load in response to a dive signal such that the controllable conductive device is non-conductive for a first duration of time and conductive for a second duration of time within a half-cycle of the AC line voltage. The control circuit may receive a signal from the controllably conductive device that represents a voltage developed across the controllable conductive device during the first duration of time. The control circuit may generate a sine-wave-shaped signal that complements the voltage developed across the controllably conductive device during the second duration of time. The control circuit may also filter the signal from the controllably conductive device during the first duration of time and the sine-wave-shaped signal during the second duration of time.

21 Claims, 14 Drawing Sheets

Related U.S. Application Data continuation of application No. 14/839,443, filed on Aug. 28, 2015, now Pat. No. 9,674,933, which is a continuation of application No. 13/793,245, filed on Mar. 11, 2013, now Pat. No. 9,155,162.

(60) Provisional application No. 61/700,964, filed on Sep. 14, 2012.

(51) Int. Cl.
| | | |
|---|---|---|
| *H05B 45/37* | (2020.01) | |
| *H05B 39/04* | (2006.01) | |
| *H05B 45/10* | (2020.01) | |
| *H05B 47/10* | (2020.01) | |
| *H05B 45/305* | (2020.01) | |
| *H05B 45/31* | (2020.01) | |

(52) U.S. Cl.
CPC ........... *H05B 45/305* (2020.01); *H05B 45/37* (2020.01); *H05B 47/10* (2020.01); *H05B 45/31* (2020.01)

(58) Field of Classification Search
USPC .......... 315/91, 294, 307, 224, 194, 246, 247
See application file for complete search history.

(56) References Cited

U.S. PATENT DOCUMENTS

| | | | |
|---|---|---|---|
| 4,661,765 A | 4/1987 | Bando et al. | |
| 5,430,356 A | 7/1995 | Ference et al. | |
| 5,629,607 A | 5/1997 | Callahan et al. | |
| 5,672,941 A | 9/1997 | Callahan et al. | |
| 5,754,036 A * | 5/1998 | Walker | G05F 1/66 |
| | | | 323/235 |
| 5,821,703 A | 10/1998 | Callahan et al. | |
| 5,834,907 A | 11/1998 | Takehara et al. | |
| 5,872,429 A * | 2/1999 | Xia | H05B 41/2981 |
| | | | 315/194 |
| 6,091,205 A * | 7/2000 | Newman, Jr. | H02M 5/2573 |
| | | | 315/194 |
| 6,118,680 A | 9/2000 | Wallace et al. | |
| 6,359,266 B2 | 3/2002 | Little et al. | |
| 6,380,692 B1 | 4/2002 | Newman, Jr. et al. | |
| 6,501,234 B2 | 12/2002 | Lin et al. | |
| 6,528,957 B1 | 3/2003 | Luchaco | |
| 7,019,469 B1 | 3/2006 | Thurk et al. | |
| 7,259,524 B2 | 8/2007 | Hausman, Jr. et al. | |
| 7,619,365 B2 * | 11/2009 | Davis | H02M 5/293 |
| | | | 315/112 |
| 7,847,440 B2 | 12/2010 | Mosebrook et al. | |
| 8,185,333 B2 | 5/2012 | Jonsson et al. | |
| 8,193,787 B2 * | 6/2012 | Valenti | H02M 5/2573 |
| | | | 323/235 |
| 8,212,424 B2 | 7/2012 | Mosebrook et al. | |
| 8,461,723 B2 | 6/2013 | Kojima et al. | |
| 8,559,972 B2 | 10/2013 | Patel et al. | |
| 8,569,956 B2 * | 10/2013 | Shteynberg | H05B 45/36 |
| | | | 315/123 |
| 8,576,589 B2 * | 11/2013 | Melanson | H02J 7/342 |
| | | | 363/49 |
| 8,614,595 B2 | 12/2013 | Acatrinei et al. | |
| 8,664,889 B2 | 3/2014 | Newman, Jr. et al. | |
| 8,729,814 B2 | 5/2014 | Salvestrini et al. | |
| 8,941,316 B2 | 1/2015 | Melanson et al. | |
| 8,957,662 B2 | 2/2015 | Newman, Jr. et al. | |
| 9,155,162 B2 | 10/2015 | Zotter et al. | |
| 9,250,669 B2 | 2/2016 | Blakeley et al. | |
| 9,544,977 B2 | 1/2017 | Economy et al. | |
| 9,553,451 B2 | 1/2017 | Zacharchuk et al. | |
| 9,674,933 B2 * | 6/2017 | Zotter | H05B 47/10 |
| 9,736,911 B2 | 8/2017 | Spira et al. | |
| 2006/0255746 A1 | 11/2006 | Kumar et al. | |
| 2006/0267515 A1 | 11/2006 | Burke et al. | |
| 2007/0001654 A1 | 1/2007 | Newman, Jr. | |
| 2007/0188110 A1 | 8/2007 | Ger et al. | |
| 2008/0007187 A1 * | 1/2008 | Zomorrodi | H05B 41/2824 |
| | | | 315/291 |
| 2009/0077405 A1 | 3/2009 | Johansen et al. | |
| 2009/0108765 A1 | 4/2009 | Weightman et al. | |
| 2009/0261758 A1 | 10/2009 | Ger et al. | |
| 2009/0315400 A1 | 12/2009 | Howe et al. | |
| 2010/0141158 A1 | 6/2010 | Newman, Jr. et al. | |
| 2010/0164579 A1 | 7/2010 | Acatrinei et al. | |
| 2010/0270982 A1 | 10/2010 | Hausman, Jr. et al. | |
| 2011/0068704 A1 | 3/2011 | McKinney et al. | |
| 2011/0121752 A1 | 5/2011 | Newman, Jr. et al. | |
| 2011/0153246 A1 | 6/2011 | Donaldson et al. | |
| 2011/0162946 A1 | 7/2011 | Altonen et al. | |
| 2011/0248640 A1 | 10/2011 | Welten et al. | |
| 2011/0291735 A1 | 12/2011 | Thirugnanasambandham et al. | |
| 2012/0043900 A1 | 2/2012 | Chitta et al. | |
| 2012/0043913 A1 | 2/2012 | Melanson et al. | |
| 2012/0098505 A1 * | 4/2012 | Irissou | H05B 39/08 |
| | | | 323/237 |
| 2012/0098516 A1 | 4/2012 | Snelten et al. | |
| 2012/0146526 A1 * | 6/2012 | Lam | H05B 41/2824 |
| | | | 315/200 R |
| 2012/0268020 A1 * | 10/2012 | Newman, Jr. | H05B 41/392 |
| | | | 315/182 |
| 2012/0281444 A1 * | 11/2012 | Dent | H02M 1/32 |
| | | | 363/56.01 |
| 2013/0154504 A1 | 6/2013 | Hick et al. | |
| 2013/0187563 A1 | 7/2013 | Sasai et al. | |
| 2013/0300301 A1 | 11/2013 | Miyahara et al. | |
| 2014/0077718 A1 | 3/2014 | Zotter et al. | |

FOREIGN PATENT DOCUMENTS

| | | |
|---|---|---|
| CN | 102934522 A | 2/2013 |
| EP | 1018208 A1 | 7/2000 |
| EP | 2654379 A1 | 10/2013 |
| WO | 02056643 A1 | 7/2002 |
| WO | 2012081350 A1 | 6/2012 |

\* cited by examiner

TWO-WIRE DIMMER WITH IMPROVED ZERO-CROSS DETECTION

CROSS-REFERENCE TO RELATED APPLICATIONS

This application is a continuation of U.S. patent application Ser. No. 15/493,345, filed Apr. 21, 2017, which is a continuation of U.S. patent application Ser. No. 14/839,443, filed Aug. 28, 2015, now issued as U.S. Pat. No. 9,674,933 on Jun. 6, 2017, which is a continuation of U.S. patent application Ser. No. 13/793,245, filed Mar. 11, 2013, now issued as U.S. Pat. No. 9,155,162 on Oct. 6, 2015, and which claims the benefit of U.S. Provisional Application No. 61/700,964, filed Sep. 14, 2012, all of which are incorporated by reference in their entirety.

BACKGROUND

Load control devices and systems control the amount of power delivered from an alternating-current (AC) power source to an electrical load, such as a lighting load, for example. Such lighting control systems typically employ a controllably conductive device, such as a thyristor or triac for example, for controlling the intensity of the lighting load. The controllably conductive device is rendered conductive at a phase angle during each half-cycle of the AC power source in response to a trigger signal received at a control input. This establishes, within each half-cycle, a conduction period where power is being delivered to the load and a non-conduction period where power is not being delivered to the load.

In a typical forward phase-control system, generation of the trigger signal is synchronized with the AC line voltage. At some time after a zero-crossing of the AC line voltage is detected, the trigger signal is generated, and the controllably conductive device is rendered conductive. The controllable conductive device remains conductive for the remainder of the AC half cycle. During the time interval between the detection of the zero-crossing and the generation of the trigger signal, the controllable conductive device is non-conductive. This time interval may also be referred to as the phase or firing angle of the system. By varying this time interval, the effective power delivered to the load is varied. Typically, this time interval is altered in response to adjustment of a dimming knob or slider by a user and/or in response to changes in a dimming signal level.

FIGS. 1A-1D depict example AC voltage waveforms as measured across the controllably conductive device. When the controllably conductive device is non-conductive, the complete AC voltage waveform, as shown in FIG. 1A, is developed across the device. At a relatively low light level, as shown in FIG. 1B, the controllably conductive device is non-conductive for a first duration 102 of the half-cycle (i.e., from the zero-crossing of the current half-cycle of the AC voltage waveform to a point within the half-cycle). The trigger signal is generated (shown as point "A"). Then, the controllably conductive device is conductive for a second duration 104 of the half-cycle. FIGS. 1C and 1D illustrate waveforms at a 50% dimming level and a relatively high light level, respectively.

At low levels of delivered power, like that depicted in FIG. 1B, even a small variation in the phase angle (and thus the conduction period) usually represents a relatively large variation in the percentage of the total RMS power delivered to the load. At these low power levels, any variation of the phase angle, whether between AC cycles or over periods of time, can be manifested as annoying and unacceptable intensity changes, including visible flickering of the light source. Since the phase angle is dependent on the detection of the zero-crossing, it is crucial that zero-cross detection be accurate and reliable. AC line conditions, however, are rarely ideal. And, less than ideal conditions can cause inaccuracy in the detection of zero-crossings, with consequent intensity variations and/or flickering, as well as other problems, especially at low levels of delivered power. One condition that can cause intensity variations and/or flickering is intermittent and/or periodic electrical noise on the AC line.

FIGS. 2A-2C illustrate example AC voltage waveforms having noise. For example, as illustrated in FIG. 2A, voltage spikes can be imposed on an AC line, which may occur when heavy equipment, such as large motor loads, are switched on and off. Electrical noise on an AC line, such as these spikes, may be incorrectly interpreted by dimming circuitry as one or more zero-crossings of the AC line voltage. Such false interpretations can lead to erratic intensity variations and/or flickering in the lighting load. Another common characteristic of electrical noise on an AC line may include a bumpy or wavy distortion, as shown in FIG. 2B, which can also cause false zero-crossing detection. The presence of harmonics of the AC fundamental on the AC line is another condition that can cause false zero-crossing detection. The presence of harmonics may change the shape of the AC line voltage waveform from a pure sinusoid to a generally sinusoidal waveform, having flattened peaks rather than round peaks, as illustrated in FIG. 2C.

One approach to mitigate the effects of noise on an AC line includes filtering the AC line voltage prior to performing zero-crossing detection. For example, the Real-Time Illumination Stability System (RTISS) uses a filter to improve the performance of a dimming system. The RTISS technology is described in commonly-assigned U.S. Pat. No. 6,091,205, issued Jul. 18, 2000, and U.S. Pat. No. 6,380,692, issued Apr. 30, 2002, both entitled Phase controlled dimming system with active filter for preventing flickering and undesired intensity changes, the entire disclosures of which are hereby incorporated by reference.

Both three-wire dimming systems and two-wire dimming systems may employ the RTISS technology. FIG. 3A depicts an example three-wire dimming system 300. FIG. 3B depicts an example two-wire dimming system 302. Both dimming systems have dimmer switches 304, 306 electrically coupled between an AC power source 308 and an electrical load 310. The dimmer switches 304, 306 are connected to the AC power source 308 by a first wire 312 (also referred to as a "hot" wire) and to the load 310 by a second wire 314 (also referred to as a "dimmed-hot" wire). However, the three-wire dimmer switch 304 also has a third wire 316 (also referred to as a "neutral" wire), which provides a path back to the return side of the AC power source 308. The two-wire dimmer switch 306 is not connected to the neutral wire 316.

The three-wire dimmer switch 304 has two waveforms available to it. A full (i.e., not switched) AC line voltage waveform 318 is available to the three-wire dimmer 304, by virtue of its third wire 316. A dimmer-voltage waveform 320, measured from the first wire 312 and the second wire 314, is also available to the three-wire dimmer 304. The three-wire dimmer switch 304 is able to use the full AC line voltage waveform 318 for filtering to determine the zero-crossings of the AC line voltage waveform of the AC power source 308 and to generate an AC load voltage waveform 322 (e.g., a dimmed-hot voltage that is measured from the second wire 314 and the third wire 316). The two-wire dimmer switch 306, on the other hand, without a path back to return side of the AC power source 308, only has the dimmer-voltage waveform 320 at its disposal, and not the full AC line voltage waveform 318.

In two-wire dimming systems, variations in phase delay associated with filtering (e.g., from the input to output of the filter) may affect the stability of the dimming system and/or the amount of error in the zero-crossing detection. Having only the dimmer-voltage waveform 320 available for filtering to determine the zero-crossings of the AC line voltage, the two-wire dimmer switch 306 may experience substantial variation in phase delay through the filter as a function of the firing angle of the controllably conductive device. To illustrate, FIG. 4 provides a plot 402 that shows how phase delay through a low-pass filter may vary as a function of firing angle in a two-wire dimmer switch. For example, as shown, a relatively large firing angle (i.e., a relatively small conduction period) may correspond to a relatively large phase delay. As the firing angle decreases (for example, from approximately 7 milliseconds to 2 milliseconds, as shown) and the conduction period increases, the phase delay decreases substantially (for example, from approximately 5.5 milliseconds to 3 milliseconds).

The variation in phase delay may affect system stability and/or the amount of error in the zero-crossing detection. Errors in zero-cross detections may further exacerbate the phase delay problem through the filter, which in turn may further increase the errors in subsequent zero-crossing detections. This positive feedback effect may lead to system instability, in the form of a runaway condition, for example.

SUMMARY

As disclosed herein, a lighting device, such as a two-wire lighting control device, may include a controllably conductive device and a control circuit. The controllably conductive device may supply an AC line voltage to a load, being non-conductive for a first duration of time and conductive for a second duration of time within a half-cycle of the AC line voltage. The control circuit may receive a signal from the controllably conductive device that represents a voltage developed across the controllable conductive device during the first duration of time. The control circuit may generate a sine-wave-shaped signal that complements the voltage developed across the controllably conductive device during the second duration of time. For example, the sine-wave shaped signal may be representative of the magnitude of the voltage generated across the load during the second duration of time. The control circuit may also filter the signal from the controllably conductive device during the first duration of time and the sine-wave-shaped signal during the second duration of time.

DETAILED DESCRIPTION

Figure 5:
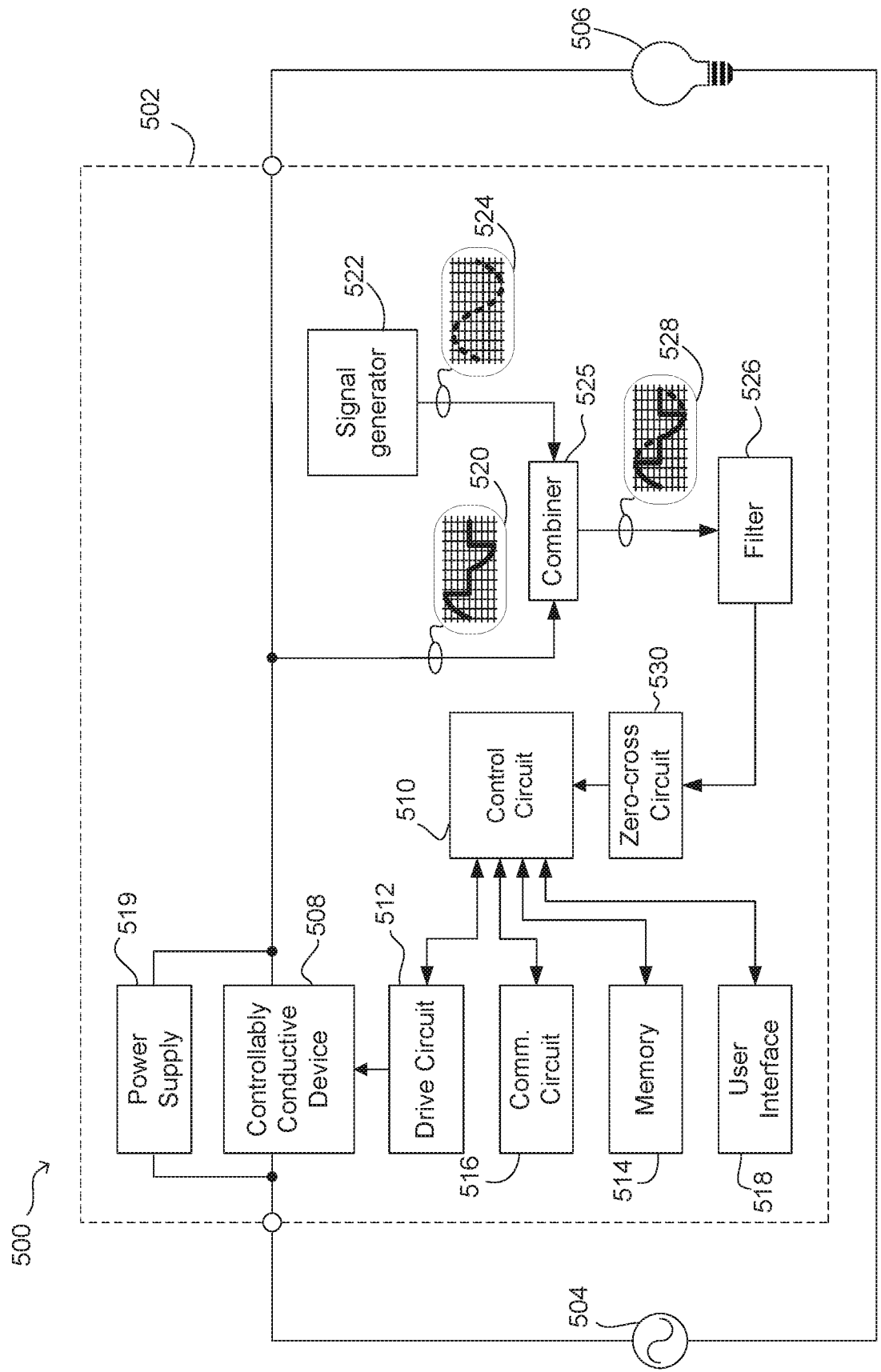
FIG. 5 is a functional block diagram of an example two-wire dimming system.

A two-wire lighting control device, may mitigate variations in phase delay through a filter by generation and application of a non-zero-magnitude signal (e.g., a fill signal) to the input of the filter. To illustrate, FIG. 5 is a functional block diagram of an example two-wire dimming system 500. The system 500 may include a two-wire lighting control device 502 (e.g., a dimmer switch or a dimming unit) connected in series with an AC power source 504 and an electrical load 506, such as an illumination load.

The two-wire lighting control device 502 may include a controllably conductive device 508, such as a thyristor, for example, a triac, electrically coupled in series between the AC power source 504 and the electrical load 506. The controllable conductive device 508 may alternatively comprise a field-effect transistor (FET) in a rectifier bridge, two FETs in anti-series connection, one or more insulated-gate bipolar junction transistors (IGBTs), back-to-back silicon-controlled rectifiers (SCRs), or any suitable bidirectional semiconductor switch.

The controllably conductive device 508 is controlled by a control circuit 510 (e.g., a controller) for causing the controllably conductive device 508 to be conductive or non-conductive. The control circuit 510 may control the controllably conductive device 508 directly or through a drive circuit 512, as illustrated in FIG. 5. The drive circuit 512 may include circuitry to convert control signals from the control circuit 510 to signals suitable for rendering the controllably conductive device 508 conductive or non-conductive. The timing of the controllably conductive device 508 becoming conductive and non-conductive may be established by the control circuit 510 and set to establish a desired dimming level in the load 506. The control circuit 510 may set the timing of the controllably conductive device 508 in accordance with the operation of a computer program and/or as manually set by the user, for example.

The control circuit 510 may include a microprocessor, a microcontroller, a programmable logic device (PLD), an application specific integrated circuit (ASIC), a field programmable gate array (FPGA), or any suitable control circuit. The control circuit 510 may include hardware, firmware, software, and/or a combination of the hardware, firmware, and/or software suitable for controlling the controllably conductive device 508. The control circuit 510 may include and/or interface with a memory 514 (i.e., memory may be internal or external to the control circuit). The memory 514 may include any component suitable for storing information. For example, the memory 514 may include volatile and/or non-volatile memory. The control circuit 510 may include programmatic aspects, such as stored computer instructions, and/or storable data associated with the operation of the two-wire lighting control device 502. These programmatic aspects may be stored in and/or retrieved from memory 514.

The control circuit 510 may interface with input/output devices such as a communication circuit 516 and/or a user interface 518. The communication circuit 516 may include any component suitable for the transmission and reception of data, such as a modem, for example. The user interface 518 may include any component suitable for presenting and receiving information from a user. For example, the user interface 518 may include one or more buttons, switches, sliders, or the like. The user interface 518 may include a display, such as one or more light-emitting diode (LED) indicators, a liquid crystal display (LCD) screen, a touch screen display, or the like. The control circuit 510 may receive commands, configuration information, or the like, via the communication circuit 516 and/or the user interface 518. The control circuit 510 may transmit information (such as the present dimming level for example, commands, or the like) via the communication circuit 516 and/or the user interface 518. For example, the control circuit 510 may, via the user interface 518, receive a specific desired dimming level from a user and confirm the user's input. Also for example, the control circuit 510 may receive a command from another device via the communication circuit 516 and/or send a command to another device. The two-wire lighting control device 502 also comprises a power supply 519 coupled in parallel with the controllably conductive device 508 for conducting a charging current through the load 506 to generate a DC supply voltage for powering the control circuit 510 and other low-voltage circuitry of the lighting control device.

Figure 1A:
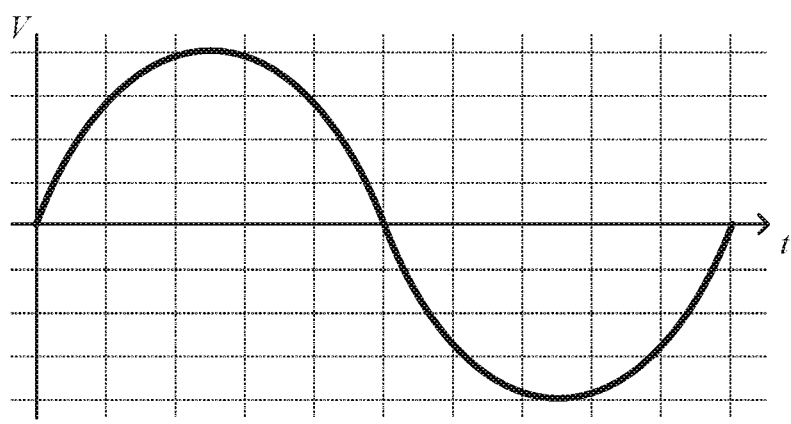
FIGS. 1A-D depict example alternating current (AC) voltage waveforms developed across a controllably conductive device in a forward phase-control dimming system.
Figure 1B:
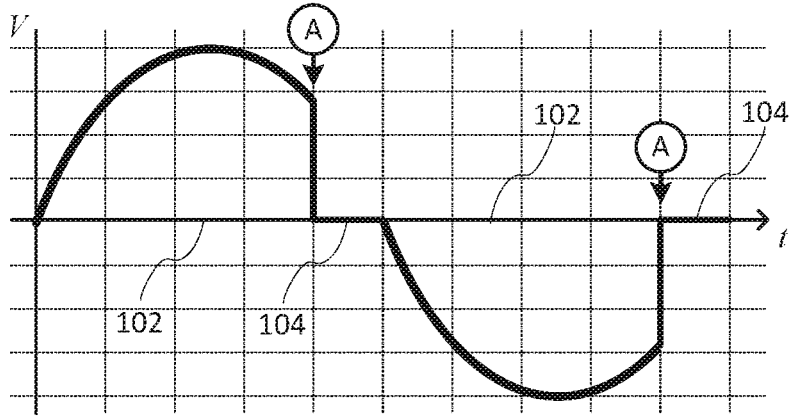
Figure 1C:
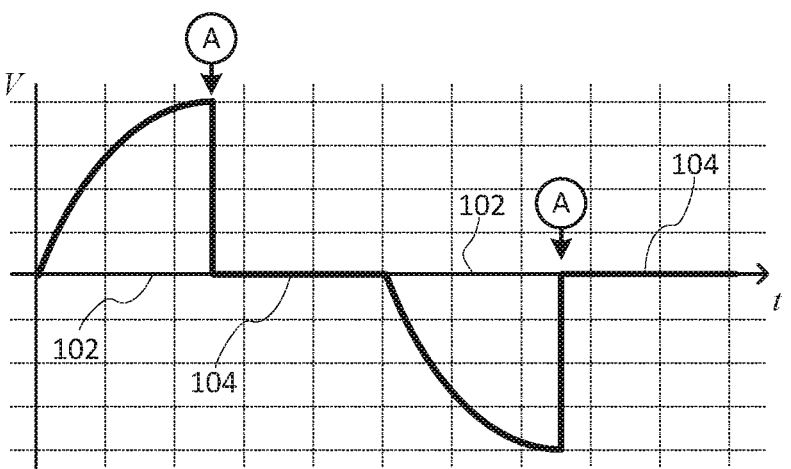
Figure 1D:
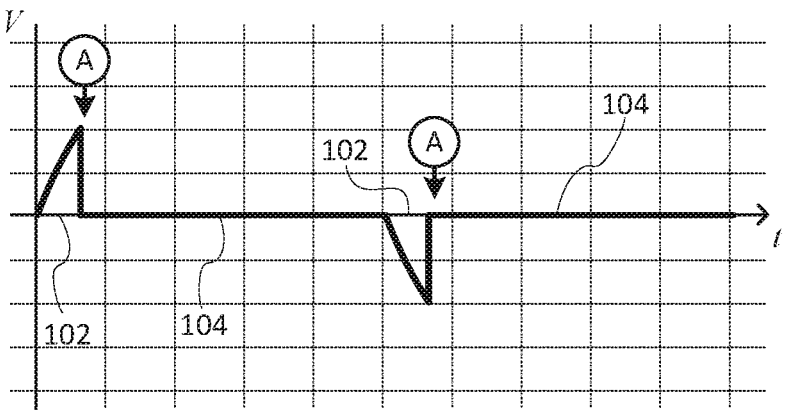
Figure 2A:
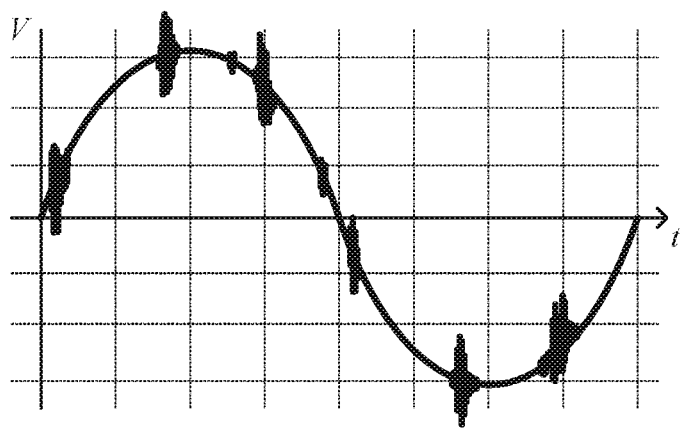
FIGS. 2A-C illustrate example AC voltage waveforms having noise.
Figure 2B:
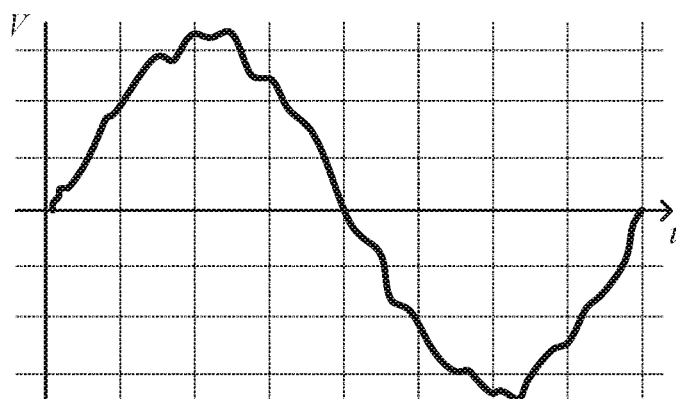
Figure 2C:
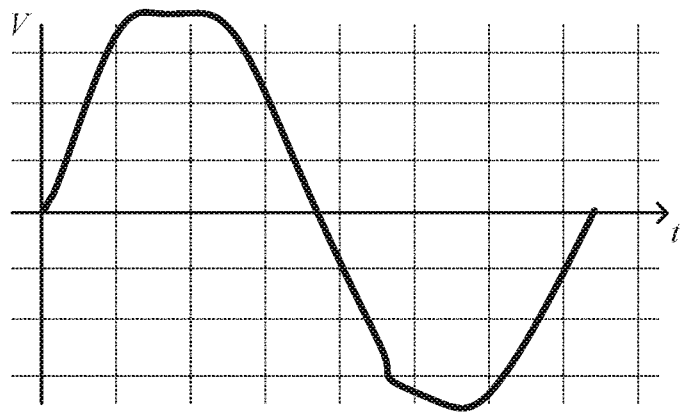
Figure 3A:
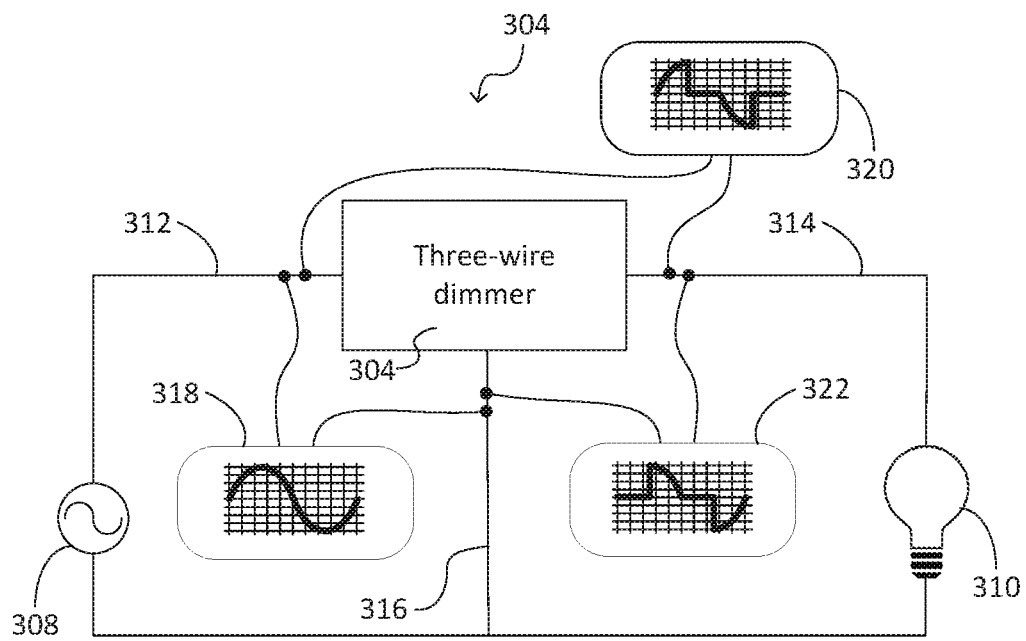
FIGS. 3A and 3B illustrated an example three-wire dimming system and a two wire dimming system, respectively.
Figure 3B:
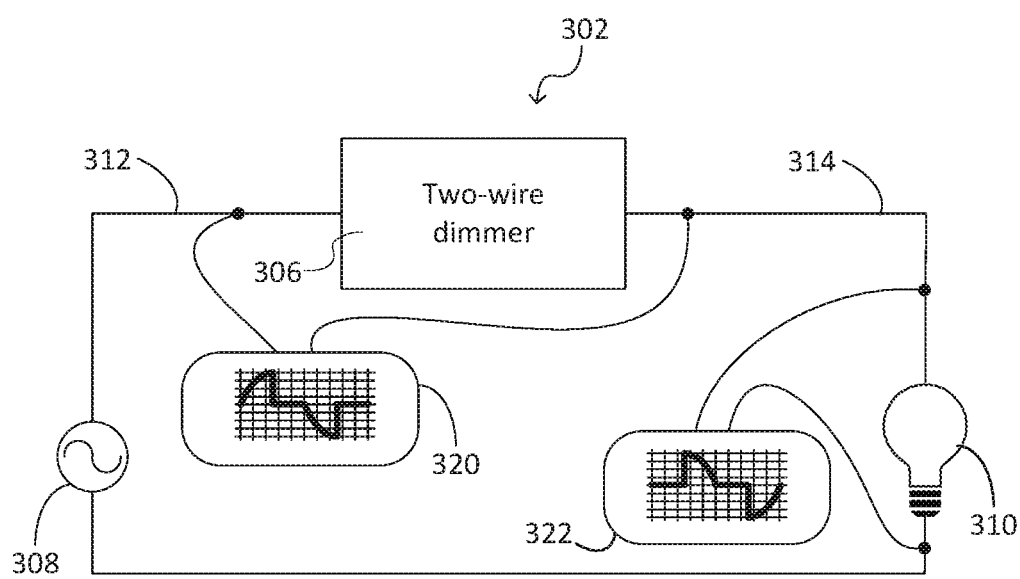
Figure 4:
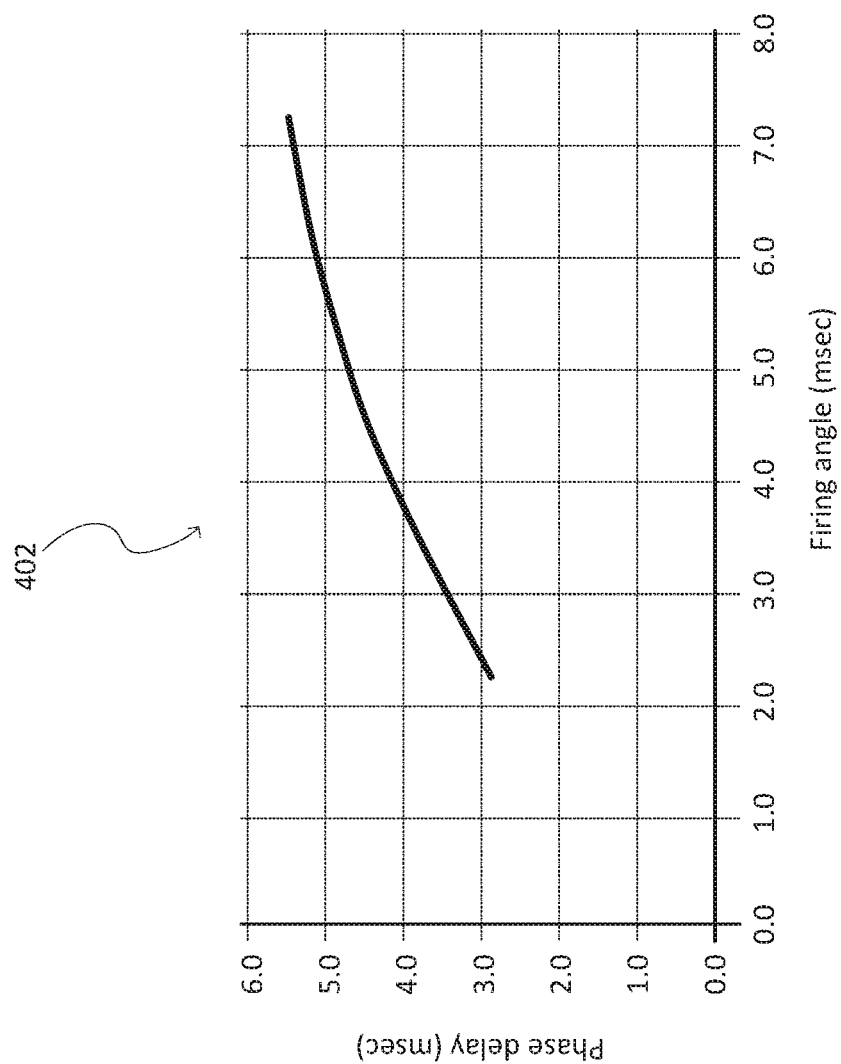
FIG. 4 is a plot showing the relationship between phase delay through a filter and firing angle in a two-wire dimming system.

A first signal 520 may be associated with the controllably conductive device. For example, the first signal 520 may represent the dimmer-voltage waveform 320 developed across the controllably conductive device 508, as depicted in FIG. 5. The first signal 520 may be transformed to make it more suitable for processing. For example, the first signal 520 may represent the dimmer-voltage waveform across the controllably conductive device with a DC component added, such that the first signal 520 maintains a positive magnitude. With regard to the dimming level, the first signal 520 may be consistent with the signals illustrated in FIGS. 1B-1D. For example, the first signal 520 may have a first portion for a first duration of time of the AC half-cycle associated with the controllably conductive device 508 being non-conductive, and a second portion for a second duration of time of the AC half-cycle associated with the controllably conductive device 508 being conductive. To illustrate, in an example operation, after a zero-crossing of the AC line voltage is detected, the control circuit 510 waits for the first duration, which may be commensurate with the desired dimming level, before generating the trigger signal. The trigger signal controls the controllably conductive device 508 to change from non-conductive to conductive, after which the first signal 520 may effectively represent zero volts until the end of the AC half cycle (i.e., consistent with a forward phase-control signal). Of course, the first signal 520 may alternatively be consistent with a reverse phase-control operation or a center phase-control operation of the controllably conductive device 508.

A signal generator 522 may generate a non-zero-magnitude signal 524 and may comprise any circuit suitable for generating a signal. For example, the signal generator may be incorporated into and/or may use functionality of the control circuit 510. For example, the signal generator 522 may include a digital signal being generated by the control circuit and output via a digital-to-analog converter. Also for example, the signal generator 522 may generate one or more pulse-width modulated signals from the control circuit 510 and convert those one or more pulse-width modulated signals into a step-sine wave.

The non-zero-magnitude signal 524 may be generated based on the operation of the control circuit 510. For example, the non-zero-magnitude signal 524 may be generated such that it complements the first signal 520 from the controllable conductive device. For example, the non-zero-magnitude signal 524 may be a fill signal, relative to the first signal 520 from the controllably conductive device, in that it fills in the "missing portion" of the first signal 520 (e.g., the portion of the first signal that represents effectively zero volts, such as a first signal with an effectively zero amplitude, for example). The non-zero-magnitude signal 524 may be sine-wave-shaped. For example, the non-zero signal may be a step-sine wave that includes steps based on at least one pulse-width modulated signal, such as a pulse width modulated signal from the control circuit 510. The step-sine-wave may also include steps based on at least one phase correction corresponding to a zero-crossing detected by the zero-crossing detector.

The first signal 520 and the non-zero-magnitude signal 524 may be combined into a combined signal 528, which is passed through a filter circuit 526. The non-zero-magnitude signal 524 may be shaped such that the filter delay associated with filtering the first signal 520 and the non-zero-magnitude signal 524 is consistent with the filter delay associated with filtering the AC line voltage. In effect, inclusion of the non-zero-magnitude signal 524 may mitigate delay variation, as a function of the dimming level, through the filter circuit 526. Thus, the non-zero-magnitude signal 524 may be shaped to maintain stability of the two-wire lighting control device 502.

The first signal 520 and the non-zero-magnitude signal 524 may be added together to form the combined signal 528 for the filter circuit 526. In this example, the non-zero-magnitude signal 524 may have a magnitude of effectively zero volts when the first signal 520 has a non-zero magnitude, and the non-zero-magnitude signal 524 may have a non-zero magnitude when the magnitude of the first signal 520 is effectively zero volts.

The first signal 520 and the non-zero-magnitude signal 524 may be combined together by a combiner circuit 525 to form the combined signal 528 for the filter circuit 526. In this example, the two-wire lighting control device 502 may include a switch (not shown), such as a multiplexer for example. The multiplexer may receive the first signal 520 on a first input and may receive the non-zero-magnitude signal 524 on a second input. The multiplexer may select the first input or the second input to output in dependence upon a select signal. The select signal may be based on the inputs. For example, when the first signal 520 has a non-zero magnitude, the multiplexer may select the first input (i.e., the first signal 520) to output, and when the magnitude of the first signal 520 is effectively zero volts, the multiplexer may select the second input (i.e., the non-zero-magnitude signal) to output. The select signal may be based on the trigger signal generated at the control input of the controllably conductive device 508 by the control circuit 510. For example, the multiplexer may operate in concert with the trigger signal between the control circuit 510 and the controllably conductive device 508. The multiplexer may select the second input (i.e., the non-zero-magnitude signal 524) when the control signal between the control circuit 510 and the controllably conductive device 508 directs the controllably conductive device 508 to become conductive (i.e., at the phase angle). And, the switch may select the first input (i.e., the first signal 520) when the controllably conductive device 508 becomes non-conductive at the end of the half-cycle.

To illustrate, the controllably conductive device 508 may be non-conductive for a first duration of time and conductive for a second duration of time. The multiplexer may select the first signal 520 during the first duration of time and the non-zero-magnitude signal 524 during the second duration of time. And, as illustrated in FIG. 5, the combined signal 528 may include a portion of the first signal 520 (shown in solid line) and a portion of the non-zero-magnitude signal 524 (shown in broken line). In the resultant combined signal 528, the non-zero-magnitude signal portion may serve to complement (e.g., to complete) the first signal portion. In other words, the non-zero-magnitude signal 524 may be a fill-signal that fills-in a missing portion of the first signal 520.

The filter circuit 526 may filter the combined signal 528 to attenuate high-frequency components, particularly high-frequency noise associated with the first signal 520 that may tend to cause errors in zero-crossing detection. The filter circuit 526 may be consistent with the filters disclosed in previously-referenced U.S. Pat. Nos. 6,091,205 and 6,380,692. For example, the filter circuit 526 may be a low-pass filter, such as, for example, a Bessel filter for example, which may be configured to provide a substantially linear phase delay of less than one-half of a period of the fundamental frequency. The low-pass filter may be configured to attenuate frequency components of the combined signal 528 that are substantially equal to third order harmonics and greater of the fundamental frequency.

The filtered output is received by a zero-cross detection circuit 530, which may detect when the magnitude of the filtered output crosses effectively zero volts (i.e., goes from positive to negative and/or from negative to positive). The zero-cross detection circuit 530 may provide information indicative of the timing of the zero-crossings to the control circuit 510. And, as described above, the control circuit 510 causes the controllably conductive device 508 to become conductive or non-conductive with timing in accordance with a desired dimming level in the load 506. For example, the timing between a zero-crossing and the subsequent trigger signal to render the controllable conductive device conductive may be commensurate with the desired dimming level.

FIGS. 6A-6E illustrate various combined signals, along with example non-zero-magnitude signal waveforms. The shape or waveform of the non-zero-magnitude signal 524 generated by the signal generator 522 may generally complement the first signal 520 to maintain stability of the overall system. For each example shown in FIGS. 6A-6E, the portion of the combined signal 528 associated with the first signal 520 is shown in solid line, and the portion of the combined signal associated with the non-zero-magnitude signal 524 is shown in broken line. Of course, one of ordinary skill will appreciate that the signals represented are examples and may be adapted for use in forward phase-control, reverse phase-control, and/or center phase-control systems.

Figure 6A:
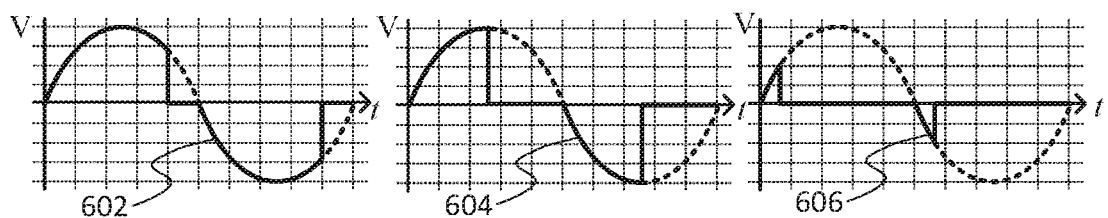
FIGS. 6A-6E illustrate various combined signals, with example non zero magnitude signal waveforms.

As shown in FIG. 6A, the combined signal may represent a smooth sinusoid. Signal 602 is an example combined signal associated with a controllably conductive device 508 operating with a low-end firing angle. Signal 604 is an example combined signal associated with a controllably conductive device operating at a 50% firing angle. And, signal 606 is an example combined signal associated with a controllably conductive device 508 operating at a high-end firing angle. The sinusoidal combined signal shown in FIG. 6A maintains a fundamental frequency consistent with that of the AC line voltage of the AC power source 504. As a result, variation in the phase delay through the filter circuit 526 as a function of the firing time may be mitigated.

Figure 6B:
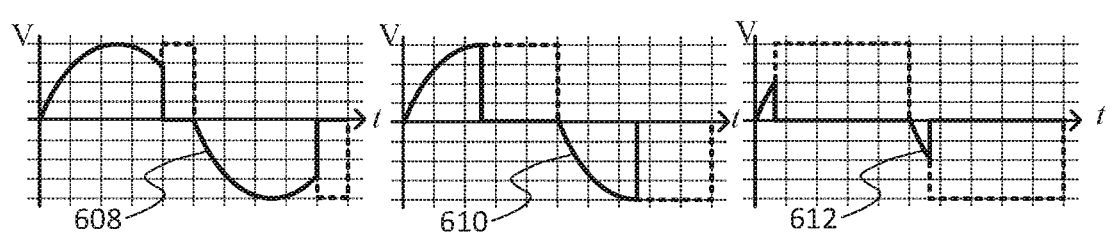

Different waveform shapes may be suitable for the portion of the combined signal associated with the non-zero-magnitude signal 524. FIG. 6B illustrates a non-zero-magnitude signal that comprises a square wave having constant amplitude. Signals 608, 610, and 612 represent low-end, 50%, and high-end, respectively. Here, the pulse width of the square wave varies with the firing angle; for example, as shown in FIG. 6B, the square wave is narrow at low-end and is much wider at high-end.

Figure 6C:
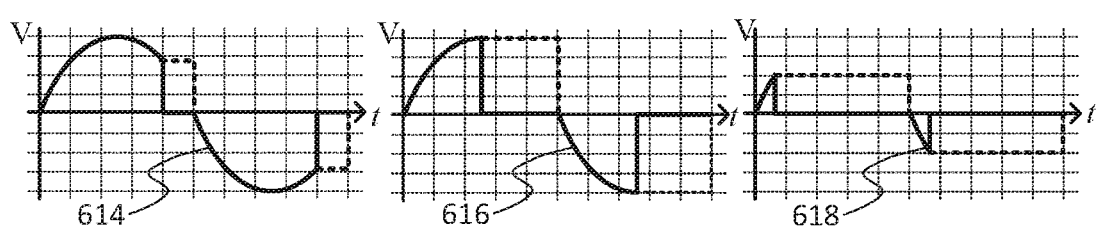

FIG. 6C shows that the width and the amplitude of the square wave may be adjusted according to the firing angle. Signals 614, 616, and 618 represent low-end, 50%, and high-end respectively. For example, the amplitude of the square wave may be selected to match that of the first signal at the firing time. Thus, at low-end, the square-wave fill signal is narrow and has a relatively of low amplitude. At 50%, the square-wave fill signal has a width of one-half of the half-cycle of the AC input signal and is at its highest amplitude (e.g., the peak amplitude of the AC input signal). At high-end, the square-wave fill signal may be at its widest, having a low amplitude, similar to that at low-end.

Figure 6D:
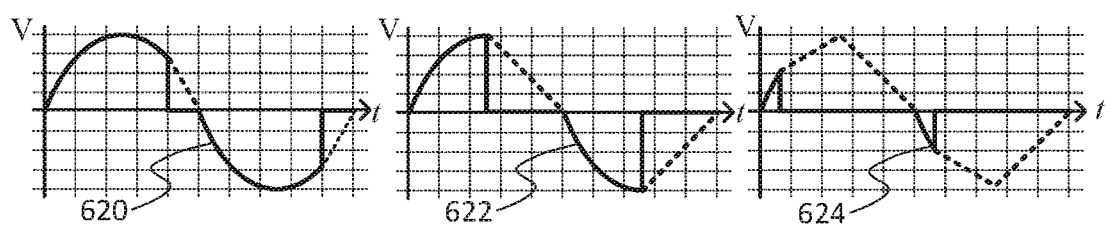

FIG. 6D shows a non-zero-magnitude signal that may comprise a triangular wave. Signals 620, 622, and 624 represent low-end, 50%, and high-end respectively. At low-end and at 50%, the fill signal may have an initial voltage similar to that of the first signal and then steadily decrease to zero. At high-end, the triangular waveform may be shaped to roughly approximate the sinusoid of the AC line voltage of the AC power source 504. For example, the non-zero-magnitude signal may extend, increasing the amplitude to a peak approximately at the center of the half-cycle of the AC line voltage and then extend, decreasing to zero volts at or around the zero-crossing of the AC power source 504.

Figure 6E:

FIG. 6E shows that a step-sine wave may be used as a non-zero-magnitude signal. Here, the step-sine wave may include a composite of multiple square waves of varying width and amplitude to approximate a sine wave. Signals 626, 628, and 630 represent low-end, 50%, and high-end respectively.

Each of the example combined signals maintains a fundamental frequency consistent with that of the original AC input signal such that variation in the phase delay through the filter as a function of the firing time may be mitigated. In effect, the non-zero-magnitude signals may provide a corrective influence when the resultant combined signal is filtered. For example, when the first signal is mostly a sinusoid and a smaller portion of the first signal is effectively zero volts, the added area from an example fill signal provides a correction to shift the center fundamental of the filter output and to compensate for any error in the firing angle. Similarly, when the first signal is represented by a small portion of sinusoid and a larger portion of zero, then the fill signal provides additional negative feedback to correct the shift in center of the fundamental of the filter output and to correct the corresponding error in the firing angle.

The example combined signals, shown in FIGS. 6A-E may be used for purposes alternative to or in addition to serving as input to a filter. For example, a combined signal may be used to make a power calculation, as disclosed in commonly-assigned U.S. patent application Ser. No. 13/793, 308, entitled POWER MEASUREMENT IN A TWO-WIRE LOAD CONTROL DEVICE, filed Mar. 11, 2013, and patented as U.S. Pat. No. 9,250,669 on Feb. 2, 2016, which is hereby incorporated by reference. For example, the combined signals shown in FIGS. 6A and 6B, may accurately depict an AC voltage waveform such that a useful power calculation may be made.

Figure 7:
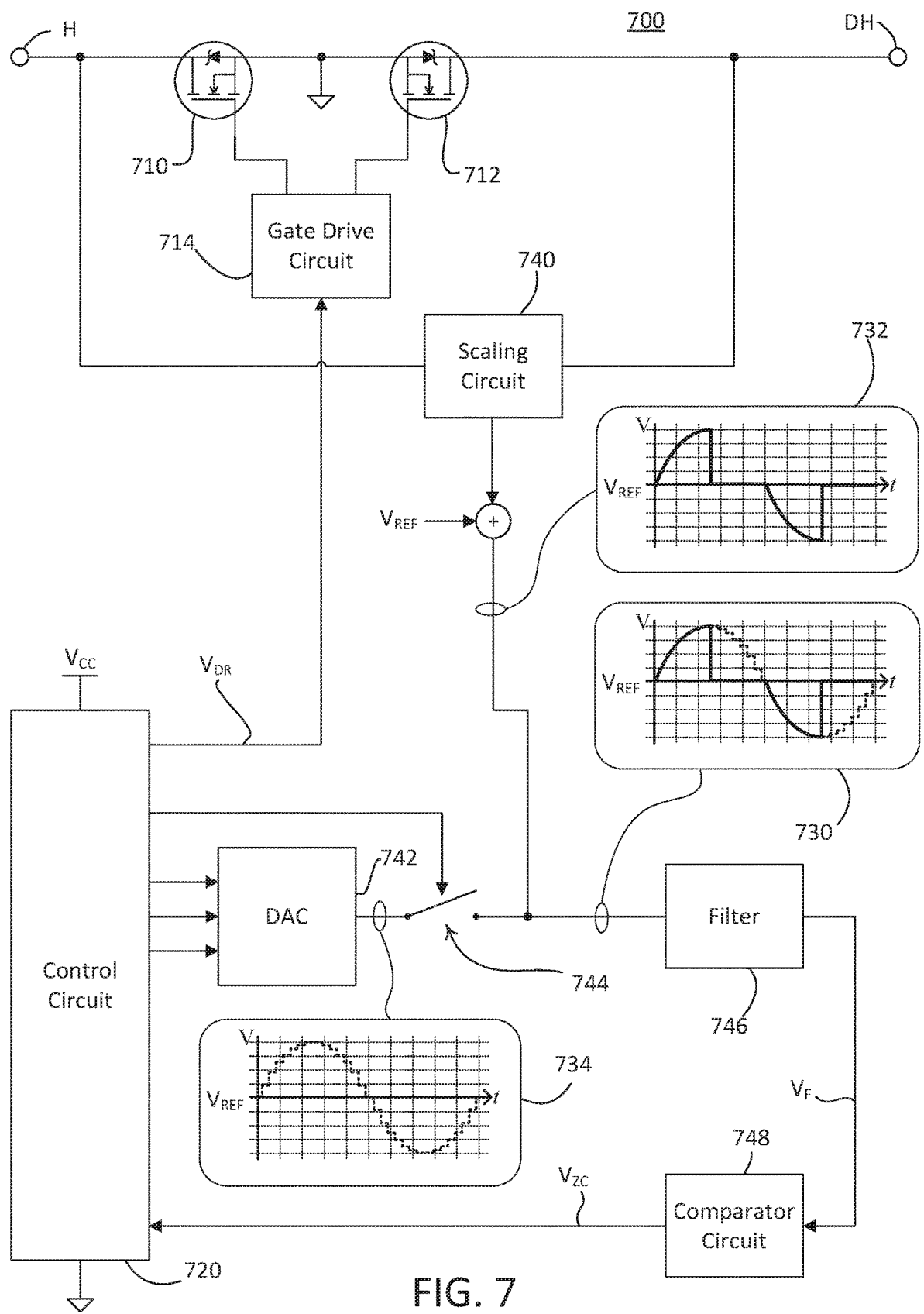
FIG. 7 is a block diagram of a portion of a two-wire lighting control device having a digital-to-analog converter for generating a non-zero-magnitude signal.

FIG. 7 is a block diagram of a portion of a two-wire lighting control device 700. The lighting control device 700 comprises a hot terminal H adapted to be coupled an AC power source (not shown) and a dimmed-hot terminal DH adapted to be coupled to a lighting load (not shown). The lighting control device 700 comprises a controllably conductive device that is implemented as two FETs 710, 712 coupled in anti-series connection. The gates of the FETs 710, 712 are coupled to a gate drive circuit 714 and the sources of the FETs are coupled together at circuit common. A control circuit 720 is coupled to the gate drive circuit 714 and generates a drive signal $V_{DR}$ for controlling the gate drive circuit to render the FETs 710, 712 conductive and non-conductive to thus control the amount of power delivered to the lighting load.

The lighting control device 700 comprises a power supply (not shown) that may be coupled across the controllably conductive device for generating a supply voltage $V_{CC}$ (e.g., approximately 3.3 volts) for powering the control circuit 720. The lighting control device 700 also comprises a reference supply (not shown) for generating a reference voltage $V_{REF}$, which may have a magnitude equal to approximately one-half of the DC supply voltage $V_{CC}$ (e.g., approximately 1.5 volts). The reference supply may comprise, for example, a simple power supply, such as a resistor-zener power supply.

The lighting control device 700 generates a combined signal 730 from a dimmer-voltage signal 732 and a non-zero-magnitude signal 734. The lighting control device 700 comprises a scaling circuit 730 coupled across the controllably conductive device (i.e., the anti-series-combination of the FETs 710, 712) for producing a scaled version of the dimmer-voltage waveform developed across the controllably conductive device to which the reference voltage $V_{REF}$ is added to generate the dimmer-voltage signal 732. Accordingly, the dimmer-voltage signal 732 is representative of the dimmer-voltage waveform developed across the controllably conductive device.

The lighting control device 700 comprises a digital-to-analog converter (DAC) 742 coupled to the control circuit 720 for generating the non-zero-magnitude signal 734. In the example of FIG. 7, the control circuit 720 may generate the non-zero-magnitude signal 734 by sending digital signal values to the digital-to-analog converter 742. For example, the control circuit 720 may have a look-up table of values stored in memory that may represent samples of the non-zero-magnitude signal 734. For example, the values may represent samples of any of the non-zero-magnitude signals, as shown in FIGS. 6A-6E. The control circuit 720 may output these digital values at regular intervals to the digital-to-analog converter 742, such that the digital-to-analog converter may generate an analog representation of the non-zero-magnitude signal 734.

The lighting control device 700 comprises a controllable switch 744, which receives the non-zero-magnitude signal 734 and is controlled by the control circuit 720 to generate the combined signal 730.

The lighting control device 700 also comprise a filter circuit 746 for filtering the combined signal 730 to generate a filtered signal $V_F$ and a comparator circuit 748 for comparing the filtered signal to the reference voltage $V_{REF}$ to generate a zero-crossing signal $V_{ZC}$ representative of the zero-crossings of the AC power source. The control circuit 720 may control the controllable switch 744 in concert with the generation of drive signal $V_{DR}$ to control the intensity of the lighting load to the desired dimming level (e.g., firing the controllable switch 708 at the same time). In an example operation, the control circuit 720 may detect a zero-crossing in the signal received from the filter circuit 746 and the comparator circuit 748. The control circuit 720 may time the generation of a control signal for dimming operation based on a desired light level for a first duration of time. And, when generating the control signal to effect dimming operation, the control circuit 720 may close the controllable switch 744 for a second duration of time (e.g., the remaining time in the AC half-cycle) until another zero-crossing is detected. In an example, the combined signal 730 may include, in the first duration of time, a signal representing the dimmer-voltage waveform developed across a controllable conductive device (not shown) and, in the second duration of time, the non-zero-magnitude signal 734 from the digital-to-analog converter 742.

The combined signal 730 may be used for purposes alternative to or in addition to serving as input to the filter circuit 746. A lighting control device may provide the combine signal 730 to a processing circuit (not shown) for performing other operations. For example, the combined signal 730 may be provided to the processing circuit in addition to the filter circuit 746. Also for example, the combined signal 730 may be provided to the processing circuit, and the filter circuit 746 and comparator circuit 748 may be omitted.

The processing circuit may include the control circuit 720 and/or any other device, system, and/or subsystem suitable for processing a signal (e.g., measuring, analyzing, transmitting, conveying, multiplexing, combining, modulating, and/or otherwise performing operation(s) on and/or on the basis of the signal). For example, the processing circuit may use the combined signal 730 to perform measurements and/or calculations regarding the AC voltage and/or current waveforms. For example, the processing circuit may use the combined signal 730 to perform a power calculation. For example, the processing circuit may use the combined signal 730 in connection with circuits that benefit from a full AC voltage waveform to operate, such as circuits that benefit from a full AC voltage waveform for timing information, for example.

Figures 8, 9:
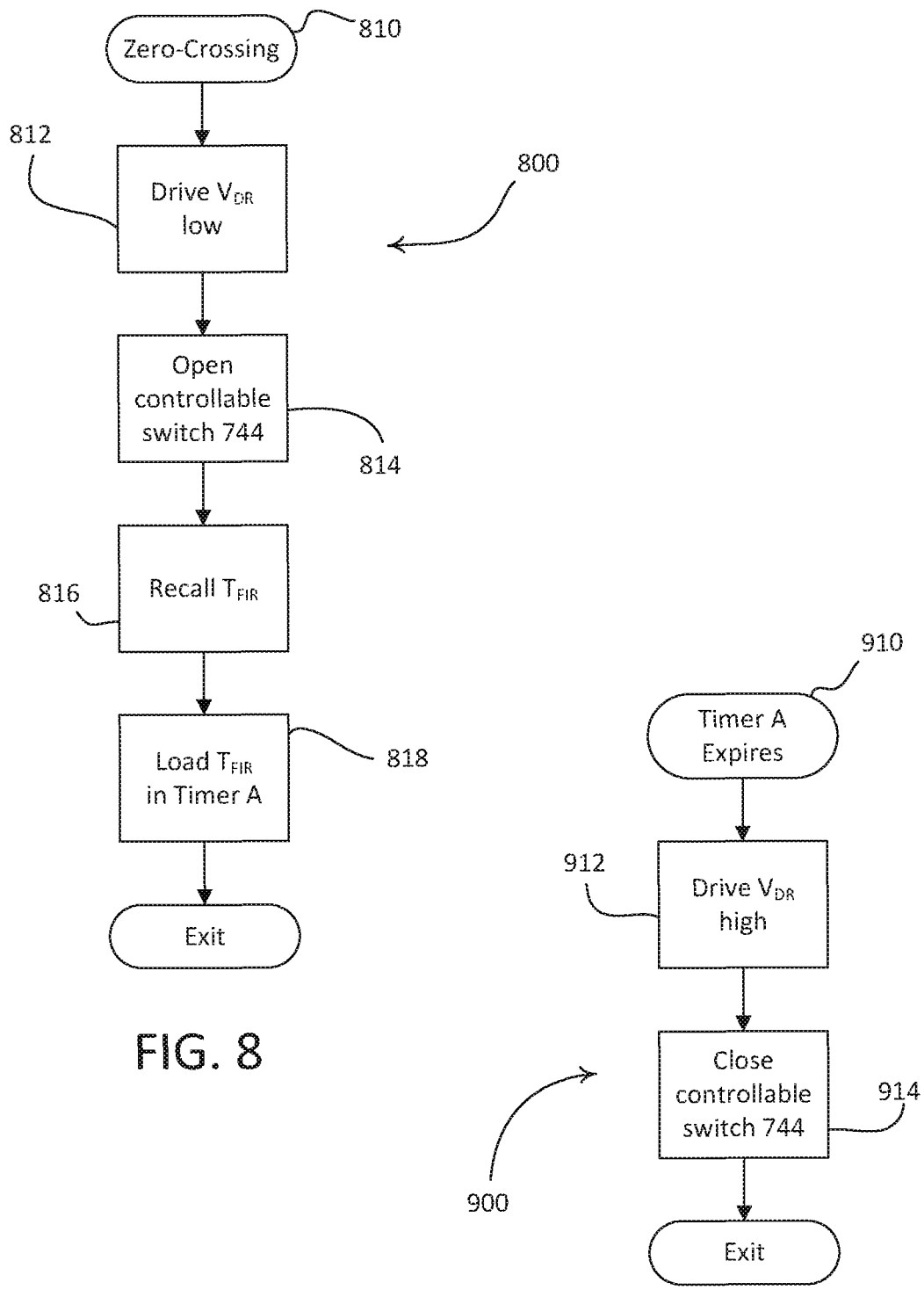
FIG. 8 is a simplified flowchart of a zero-crossing procedure executed periodically by a control circuit of the lighting control device of FIG. 7.
FIG. 9 is a simplified flowchart of a dimming timer procedure executed by the control circuit of the lighting control device of FIG. 7.

FIG. 8 is a simplified flowchart of a zero-crossing procedure 800 executed periodically by a control circuit (e.g., the control circuit 720 of the lighting control device 700) at step 810 (e.g., in response to the zero-crossing signal $V_{ZC}$).

First, the control circuit 720 drives the drive signal $V_{DR}$ to the gate drive circuit 714 low (e.g., to approximately circuit common) at step 812, such that the FETs 710, 712 are non-conductive at the beginning of the half-cycle. At step 814, the control circuit 720 controls the controllable switch 744 to be open (i.e., non-conductive), such that the combined signal 730 is equal to the dimmer-voltage signal 732. The control circuit 720 then recalls the firing time $T_{FIR}$ (i.e., the firing angle) for the present half-cycle to control the intensity of the lighting load to the desired dimming level at step 816. At step 818, the control circuit 720 loads the firing time $T_{FIR}$ into timer A and starts timer A, decreasing in value with respect to time, before the zero-crossing procedure 800 exits. The control circuit 720 will execute a dimming timer procedure 900 when timer A expires.

FIG. 9 is a simplified flowchart of the dimming timer procedure 900, which is executed by the control circuit 720 when timer A expires at step 910 (i.e., after the firing time $T_{FIR}$ from the beginning of the half-cycle). The control circuit 720 drives the drive signal $V_{DR}$ high (e.g., to approximately the DC supply voltage $V_{CC}$) at step 912 to render the FETs 710, 712 conductive, and then closes the controllable switch 744 at step 914, such that the digital-to-analog converter 742 is coupled to the filter circuit 746. Since the magnitude of the dimmer-voltage signal 732 decreases to approximately zero volts when the FETs 710, 712 are rendered conductive, the combined signal 730 is equal to the non-zero-magnitude signal 734 generated by the digital-to-analog converter 742 after the firing time $T_{FIR}$. The dimming timer procedure 900 procedure then exits, and the zero-crossing procedure 800 will be executed at the next zero-crossing as determined by the zero-crossing signal $V_{ZC}$.

Figure 10A:
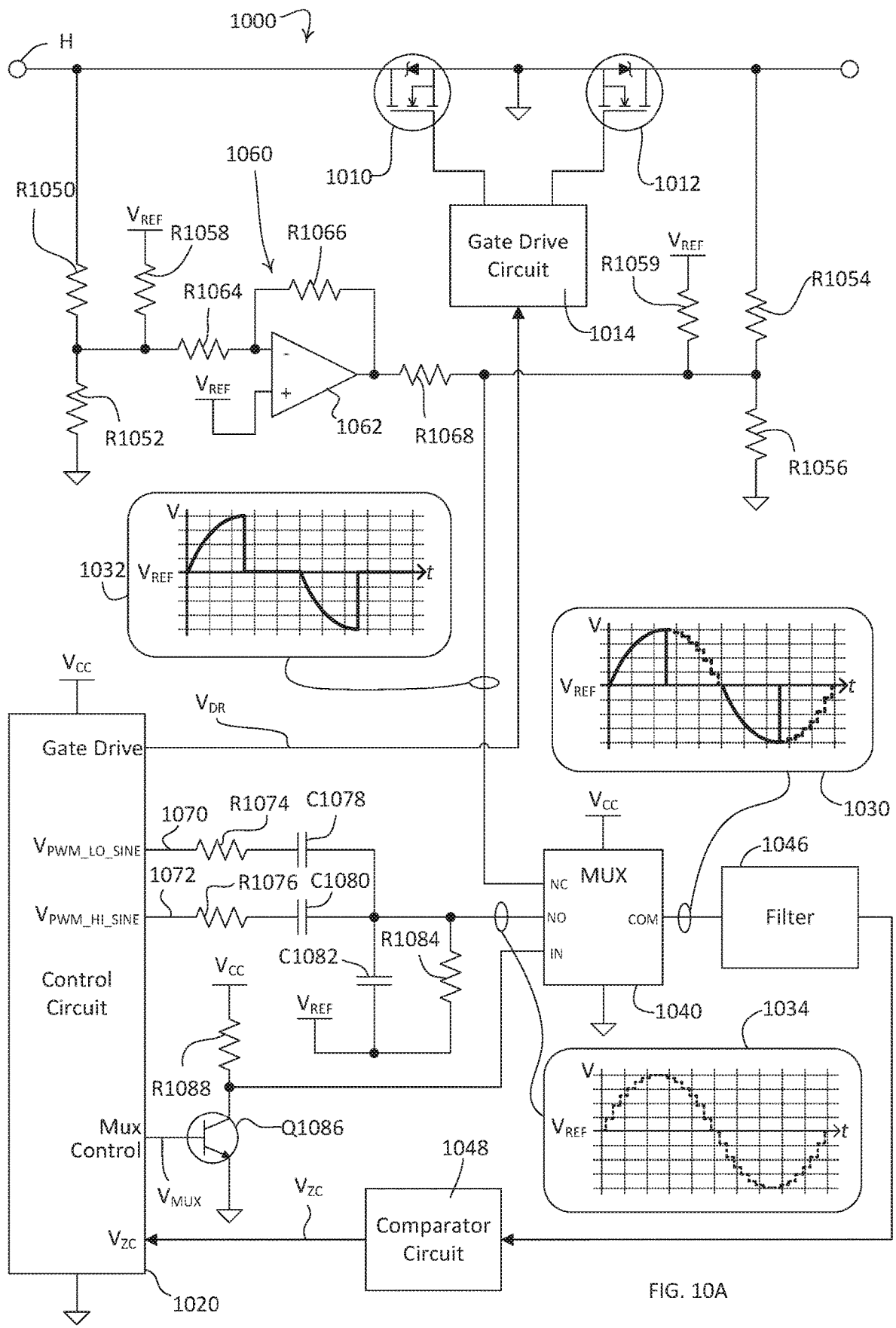
FIG. 10A is a block diagram of a portion of a two-wire lighting control device that uses pulse-width modulation to generate a non-zero-magnitude signal.
Figure 10B:
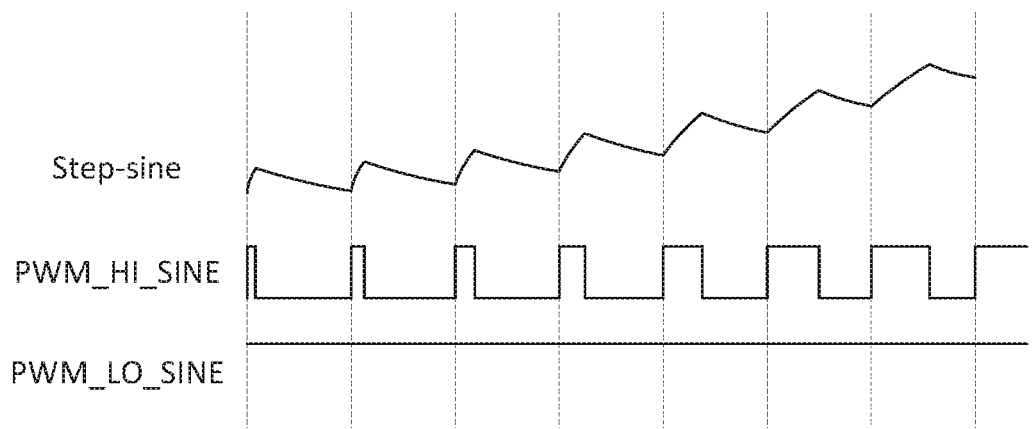
FIGS. 10B and 10C present corresponding signal diagrams.
Figure 10C:
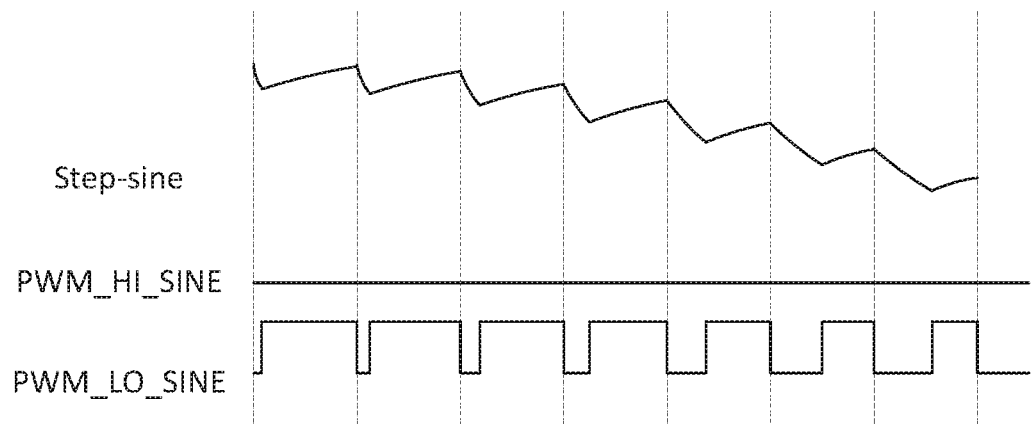

FIG. 10A is a simplified schematic diagram of a portion of a two-wire lighting control device 1000, which uses pulse-width modulation to generate a non-zero-magnitude signal. FIGS. 10B and 10C depict corresponding signal diagrams. As in the lighting control device 700 of FIG. 7, the lighting control device 1000 comprises two FETs 1010, 1012 in anti-series connection as the controllably conductive device adapted coupled in series between the AC power source and the lighting load. The FETs 1010, 1012 are rendered conductive and non-conductive in response to a drive signal $V_{DR}$ provided to a gate drive circuit 1014 by a control circuit 1020 to control the amount of power delivered to the lighting load.

The lighting control device 1000 comprises a multiplexer 1040 for generating a combined signal 1030, a filter 1046 for filtering the combined signal, and a comparator circuit 1048 for generating a zero-crossing signal representative of the zero-crossings of the AC power source. The multiplexer 1040 receives a first signal 1032, which is received from the controllably conductive device, for example, at a normally closed (NC) input of the multiplexer. The first signal 1032 is representative of the dimmer-voltage waveform developed across the controllably conductive device. The lighting control device 1000 comprises a first resistive divider including resistors R1050, R1052, which are coupled in series between the hot terminal H and circuit common, and have resistances of, for example, approximately 784 kΩ and 15 kΩ, respectively. The lighting control device 1000 also comprises a second resistive divider including resistors R1054, R1056, which are coupled in series between the dimmed-hot terminal DH and circuit common, and have resistances of, for example, approximately 784 kΩ and 15 kΩ, respectively.

During the positive half-cycles, current is conducted from the hot terminal H and through the first resistive divider and the body diode of the second FET 1012, such that a scaled voltage representative of the dimmer-voltage waveform across the controllably conductive device is generated by the first resistive divider. During the negative half-cycles, current is conducted from the dimmed-hot terminal DH and through the second resistive divider and the body diode of the first FET 1010, such that a scaled voltage representative of the dimmer-voltage waveform across the controllably conductive device is generated by the second resistive divider. The junction of the resistors R1050, R1052 of the first resistive divider is coupled to the reference voltage $V_{REF}$ through a resistor R1058 (e.g., having a resistance of approximately 5.49 kΩ), and the junction of the resistors R1054, R1056 of the second resistive divider is coupled to the reference voltage $V_{REF}$ through a resistor R1059 (e.g., having a resistance of approximately 5.49 kΩ). Accordingly, the scaled voltages generated by the first and second resistive dividers are referenced about the reference voltage $V_{REF}$ (and not referenced to circuit common).

The first signal 1032 is generated by combining the scaled voltages generated by the first and second resistive dividers. However, since the scaled voltages generated by the first and second resistive dividers are rectified by the body diodes of the FETs 1010, 1012, the output of the first resistive divider is coupled to the output of the second resistive divider by an inverting circuit 1060, which comprises an operational amplifier ("op-amp") 1062. The scaled voltage generated by the first resistive divider is coupled to the non-inverting input of the op-amp 1062 via a resistor R1064 (e.g., having a resistance of approximately 464 kΩ). The non-inverting input is coupled to the output of the op-amp 1062 via a resistor R1066 (e.g., having a resistance of approximately 464 kΩ), and the inverting input of the op-amp is coupled to the reference voltage $V_{REF}$. The output of the op-amp 1062 is coupled to the output of the second resistive divider via a resistor R1068 (e.g., having a resistance of approximately 5.49 kΩ). Accordingly, the first signal 1032 looks like an AC voltage waveform that is reference about the reference voltage $V_{REF}$, such that the magnitude of the first signal is always positive. In other words, the first signal 1032 is representative of the dimmer-voltage waveform generated across the controllably conductive device (which is an AC voltage waveform), but does not drop below zero volts, such that the first signal may be processed by standard digital circuitry.

The non-zero-magnitude signal comprises a step-sine wave 1034 generated by a pair of complementary pulse-width modulated channels on the control circuit 1020: a $V_{PWM\_LO\_SINE}$ channel 1070 and a $V_{PWM\_HI\_SINE}$ channel 1072. The functionality of the pulse-width modulated channels may be an available feature of a microprocessor-based control circuit. The pulse-width modulated channels may be pulse-width modulated channels available on a microprocessor, a dedicated integrated circuit, composed of fundamental circuit elements, and the like. The complementary pulse-width modulated channels output of the control circuit 1020 via respective resistors R1074, R1076 and respective capacitors R1078, R1080. The pulse-width modulated channels output across a storage RC circuit, including storage capacitor C1082 and corresponding resistor R1084 relative to the filter reference voltage $V_{REF}$. The step-sine wave 1034 generated by the complementary pulse-width modulated channels and accompanying circuitry is provided to a normally-open (NO) input of the multiplexer 1040.

The multiplexer 1040 may switch between the NC input (i.e., the first signal 1032) and the NO input (i.e., the step-sine wave 1034) in response to a select-input control signal $V_{MUX}$ provided at a Mux Control output of the control circuit 1020. The select-input control signal $V_{MUX}$ is coupled to a select input (IN) of the multiplexer 1040 via a circuit comprising a transistor Q1086 and a resistor R1088. The control circuit 1020 may signal at the Mux Control output in concert with controlling the dimming operation of the FETs 1010, 1012 such that the first signal 1032 and the step-sine wave 1034 are combined to form the combined signal 1030 at the output COM pin of the multiplexer 1040. When the select-input control signal $V_{MUX}$ is driven high (i.e., to approximately the DC supply voltage $V_{CC}$), the transistor Q1086 is rendered conductive and the select input IN of the multiplexer 1040 is pulled down to circuit common, such that the first signal 1032 at the NC input is provided at the output COM pin of the multiplexer. When the select-input control signal $V_{MUX}$ is driven low (i.e., to approximately circuit common), the transistor Q1086 becomes non-conductive and the select input IN of the multiplexer 1040 is pulled up towards the DC supply voltage $V_{CC}$ through the resistor 1088, such that the step-sine wave 1034 at the NO input is provided at the output COM pin of the multiplexer.

In operation, the complementary pulse-width modulated channels $V_{PWM\_LO\_SINE}$, $V_{PWM\_HI\_SINE}$ add or subtract charge to and from the storage capacitor C1082 to adjust the magnitude of the step-sine wave 1034 with respect to the reference voltage $V_{REF}$. As illustrated in FIG. 10B, in each positive half-cycle of the step-sine wave 1034, the PWM_LO_SINE channel 1070 stays in a high default state, while the PWM_HI_SINE channel 1072 is controlled through a series of pulses to add charge to the storage capacitor C1082 when the PWM_HI_SINE channel 1072 is high and to subtract charge from the storage capacitor C1082 when the PWM_HI_SINE channel 1072 is low. By controlling the duty cycle of the pulses of the PWM_HI_SINE channel 1072 (i.e., the amount of time that the PWM_HI_SINE channel 1072 is high versus low), the control circuit 1020 is able to adjust the magnitude of the step-sine wave 1034 in each positive half-cycle. In each negative half-cycle of the step-sine wave 1034 as illustrated in FIG. 10C, the PWM_HI_SINE channel 1072 stays in a low default state, while the PWM_LO_SINE channel 1070 is controlled through a series of pulses to subtracts charge from the storage capacitor C1082 when the PWM_LO_SINE channel 1070 is low and to add charge to the storage capacitor C1082 when the PWM_LO_SINE channel 1070 is high.

As illustrated, the width of the pulse may affect the rate of change of the step-sine wave 1034. For example, changing the width of each pulse of the PWM_HI_SINE channel 1072 may change the overall rate of change in the step-sine wave 1034 in the positive direction. Similarly, changing the width of each pulse of the PWM_LO_SINE channel 1070 may change the overall rate of change in the step-sine wave 1034 in the negative direction.

To generate the appropriate duty cycles for the pulse-width modulated channels, the control circuit 1020 may have stored one or more tables. The control circuit 1020 may control the state of each of the pulse-width modulated channels, performing a "SET" when a timing counter is zero and a "RESET" when the counter reaches a value, such as a value stored in a register. In light of the SET/RESET structure, the frequency of the step-sine wave 1034 may be configurable, for example, to match the line frequency. An AC half-cycle may be divided into a number of bins, and the modulo of a timer channel may be used to control the period of the half-cycle. The modulo may be $1/N_{BINS}$ of the half-cycle period where $N_{BINS}$ is the number of bins used. The timer channel may calculate the half-cycle period on a half-cycle-by-half-cycle basis. Also, for example, the number $N_{BINS}$ of bins in the half-cycle may be selected to be an exponent of two. To illustrate, the number $N_{BINS}$ of bins may be 32 per half-cycle to provide acceptable resolution and preserve processing capacity by limiting the number of interrupts required.

One or more lookup tables may be created to generate the step-sine wave 1034. Each value from the lookup table may be fed into the value register. At each timer overflow, the next value may be loaded. Each value, when loaded, may establish the voltage value for that bin. In effect, the voltage step in each bin may be proportional to the duty cycle in that bin, and the duty cycle is provided by the value from the register. The frequency of the step-sine wave 1034 may be set based on a look-up table, created from a sine table. Here, the duty cycle is "value/modulo," and the "modulo" is based on the line frequency (e.g., modulo=f/2*32, for 32 bins).

The table values may be scaled. The scaled tables may have a three-element depth, which may allow read and write functions each to have ownership of one element, with one element in redundancy. The task execution may be asynchronous, and a page switching scheme may be used to make sure that reading and writing avoid overlapping. Also, the page switching scheme may be used to ensure that table updates are absorbed at the zero cross.

In operation, the control circuit 1020 may have a number of interrupts. At each interrupt, two functions may be performed. The first function may include loading a new value for the next bin. This action may be performed every time the interrupt occurs. The second function may include prepping the timer channels for the next half cycle. This function may be performed at the zero-cross (i.e., starting bin zero), when the modulo may be updated to match the latest value for the upcoming half cycle. At this point, the scaled sine table may also be checked for a new valid page.

The register buffers may require management. In some microprocessors there may be an inherent delay built into the pulse-width modulation registers. The delay may be caused by registers being buffered where the buffer value is applied to the timer channel when the timer counter is reset. The buffering ensures that a single pulse-width modulation cycle is completed before changing the parameters. To account for this buffering, loading a value for a given bin may be performed one bin in advance.

Processing each zero-crossing may introduce latency into the system. For example, there may be a certain amount of delay attributed to the zero-cross interrupt service routine. Phase error may be calculated and corrected in the step-sine signal. For example, the phase error may be calculated based on difference of a real zero-cross and the zero-cross of the step-sine wave 1034. The phase error may be calculated by the control circuit 1020 before loading the modulo for the next half-cycle. Once the phase error is calculated, one or more correction values may be established. The one or more correction values may be selected such that the phase error will be canceled out by the next zero-cross. For example, a correction value equal to the phase error divided by the number of bins may be added to each bin for the subsequent half-cycle. With this correction in the subsequent half-cycle, the step-sine wave will "catch up" to the real zero crossing. With continuous correction, the step-sine wave may maintain synchronicity with the AC source signal.

Figure 11:
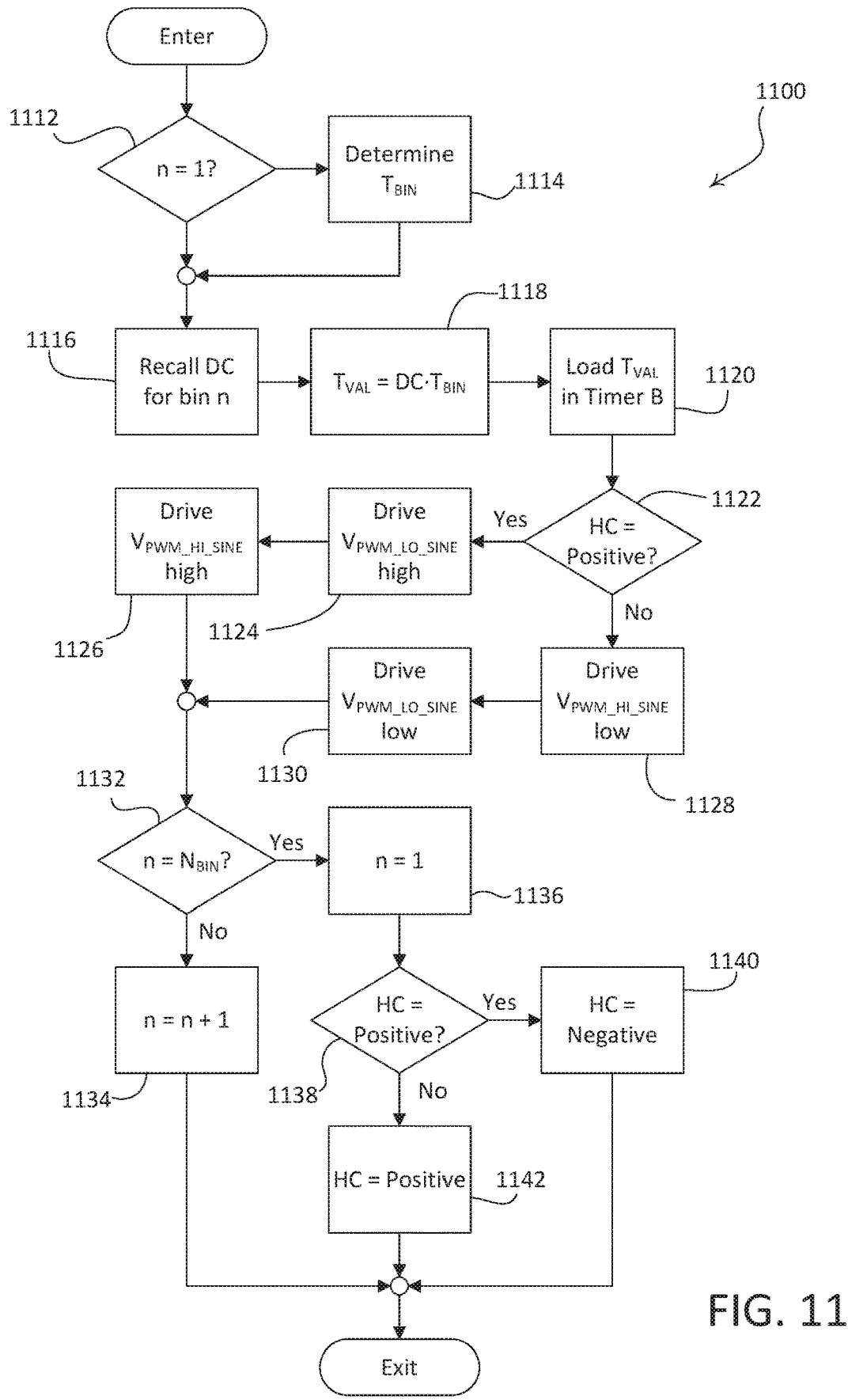
FIG. 11 is a simplified flowchart of a bin set procedure executed periodically by a control circuit of the lighting control device of FIG. 10A for generating the non zero-magnitude signal.

FIG. 11 is a simplified flowchart of a bin set procedure 1100 executed periodically by a control circuit (e.g., the control circuit 1020 of the lighting control device 1000) at the beginning of each bin of the step-sine wave 1034 at step 1110 (e.g., once every 3.75 μsec for a 60-Hz AC line voltage). The control circuit 1020 uses a variable n to keep track of the present bin during the half-cycle. If the variable n is equal to one at step 1112 (i.e., it is the first bin of the half-cycle), the control circuit 1020 determines the period $T_{BIN}$ of the bins for the present half-cycle at step 1114. For example, the control circuit 1020 may calculate the period $T_{BIN}$ using the number $N_{BINS}$ of bins in the half-cycle and a period $T_{HC}$ of the half-cycle, i.e.: $T_{BIN} = 1/N_{BINS} \cdot T_{HC}$.

The control circuit 1020 may also update the value used for the period $T_{HC}$ of the half-cycle in response to the zero-crossings determined from the zero-crossing signal $V_{ZC}$ to account for errors or changes in the frequency of the AC line voltage.

Next, the control circuit 1020 recalls the duty cycle DC for bin n as stored in the memory at step 1116, and determines the period $T_{PLS}$ of the pulse for the present bin at step 1118, i.e., $$T_{PLS} = DC \cdot T_{BIN}.$$

At step 1120, the control circuit 720 loads the period $T_{PLS}$ of the pulse into timer B and starts timer B decreasing in value with respect to time, such that a bin reset procedure 1200 (which will be described in greater detail below with reference to FIG. 12) will be executed when timer B expires. If the present half-cycle is a positive half-cycle at step 1122, the control circuit 1020 drives the PWM_LO_SINE channel 1070 high at step 1124 and the PWM_HI_SINE channel 1072 high at step 1126. If the present half-cycle is a negative half-cycle at step 1122, the control circuit 1020 drives the PWM_HI_SINE channel 1072 low at step 1128 and the PWM_LO_SINE channel 1070 low at step 1130.

If the variable n is not equal to the number $N_{BINS}$ of bins in the half-cycle at step 1132, the control circuit 1020 increments the variable n by one at step 1134, and the bin set procedure 1100 exits. If the variable n is equal to the number $N_{BINS}$ of bins in the half-cycle at step 1132 (i.e., it is the end of the present half-cycle), the control circuit 1020 sets the variable n equal to one at step 1136. If the present half-cycle is a positive half-cycle at step 1138, the control circuit 1020 sets the present half-cycle to negative at step 1138, and the bin set procedure 1100 exits. If the present half-cycle is a negative half-cycle at step 1138, the control circuit 1020 sets the present half-cycle to positive at step 1140, and the bin set procedure 1100 exits.

Figure 12:
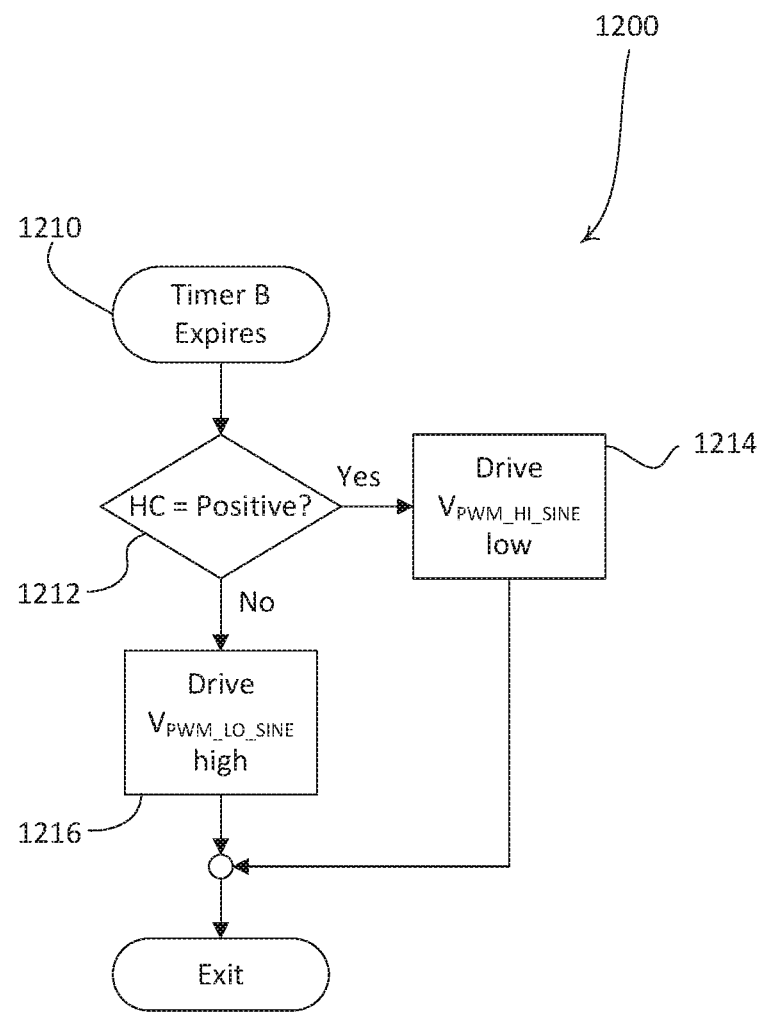
FIG. 12 is a simplified flowchart of a bin reset procedure executed by the control circuit of the lighting control device of FIG. 10A for generating the non zero-magnitude signal.

FIG. 12 is a simplified flowchart of the bin reset procedure 1200, which is executed by a control circuit the control circuit 1020 when timer B expires at step 1210 (i.e., after the period $T_{PLS}$ of the pulse). If the present half-cycle is a positive half-cycle at step 1212, the control circuit 1020 drives the PWM_HI_SINE channel 1072 low at step 1214 and the bin reset procedure 1200 exits. If the present half-cycle is a negative half-cycle at step 1212, the control circuit 1020 drives the PWM_LO_SINE channel 1070 high at step 1216, before the bin reset procedure 1200 exits. The control circuit 1020 will execute the bin set procedure 1100 again at the beginning of the next bin.

Figure 13:
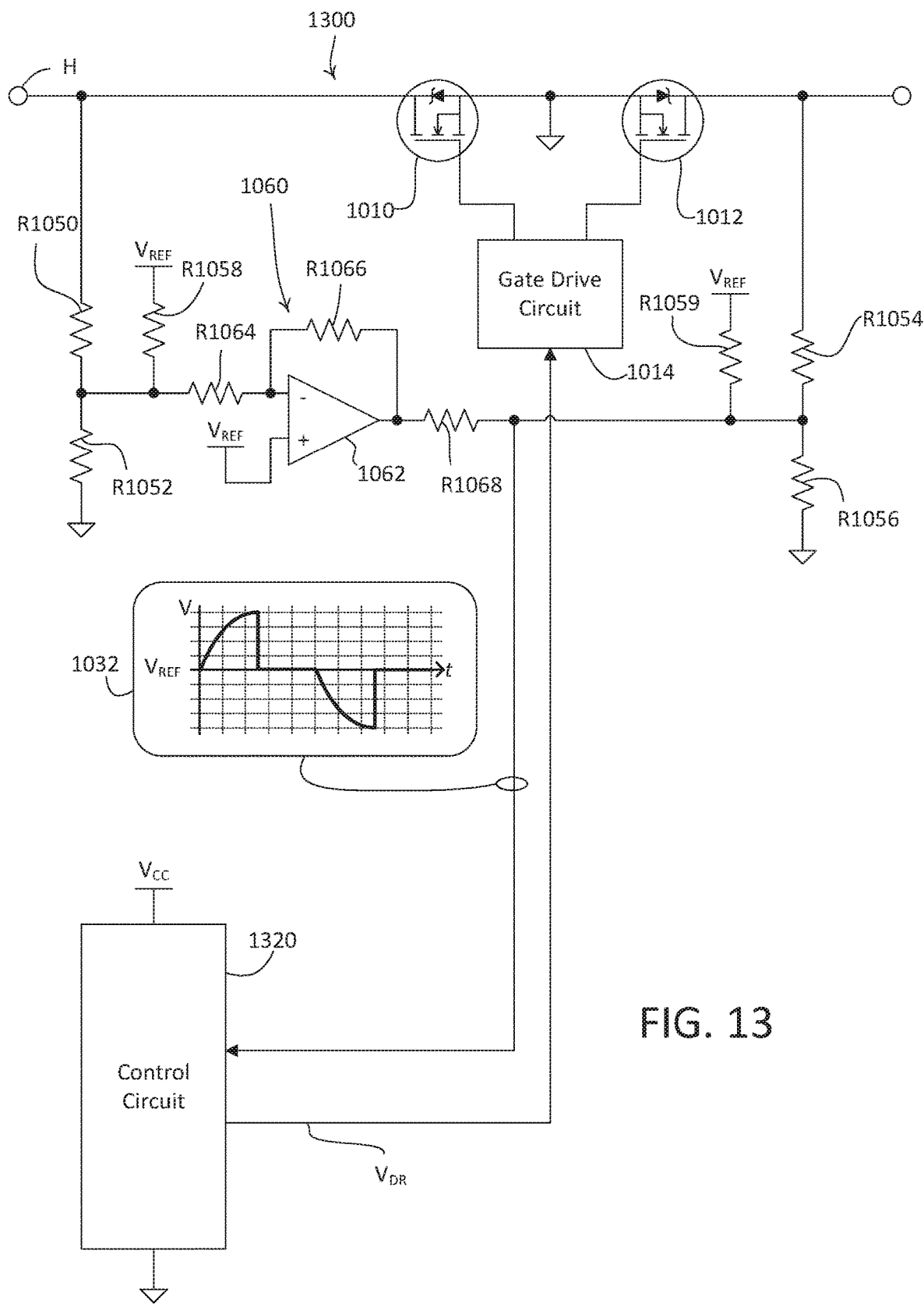
FIG. 13 is a simplified schematic diagram of a portion of an example two-wire lighting control device.

FIG. 13 is a simplified schematic diagram of a portion of an example two-wire lighting control device 1300. The lighting control device 1300 comprises a control circuit 1320 that simply receives the first signal 1032 that is representative of the dimmer-voltage waveform developed across the controllably conductive device (i.e., the FETs 1010, 1012). The control circuit 1320 is operable to generate the drive signal $V_{DR}$ for rendering the FETs 1010, 1012 in response to simply the first signal 1032. The control circuit 1320 is operable to generate a digital combined signal $S_{COMB}$, which is filtered using a digital Bessel filter. The control circuit 1320 uses a filtered signal $S_{FILT}$, which is the output of the digital filter, to determine the zero-crossings of the AC voltage waveform.

Figure 14:
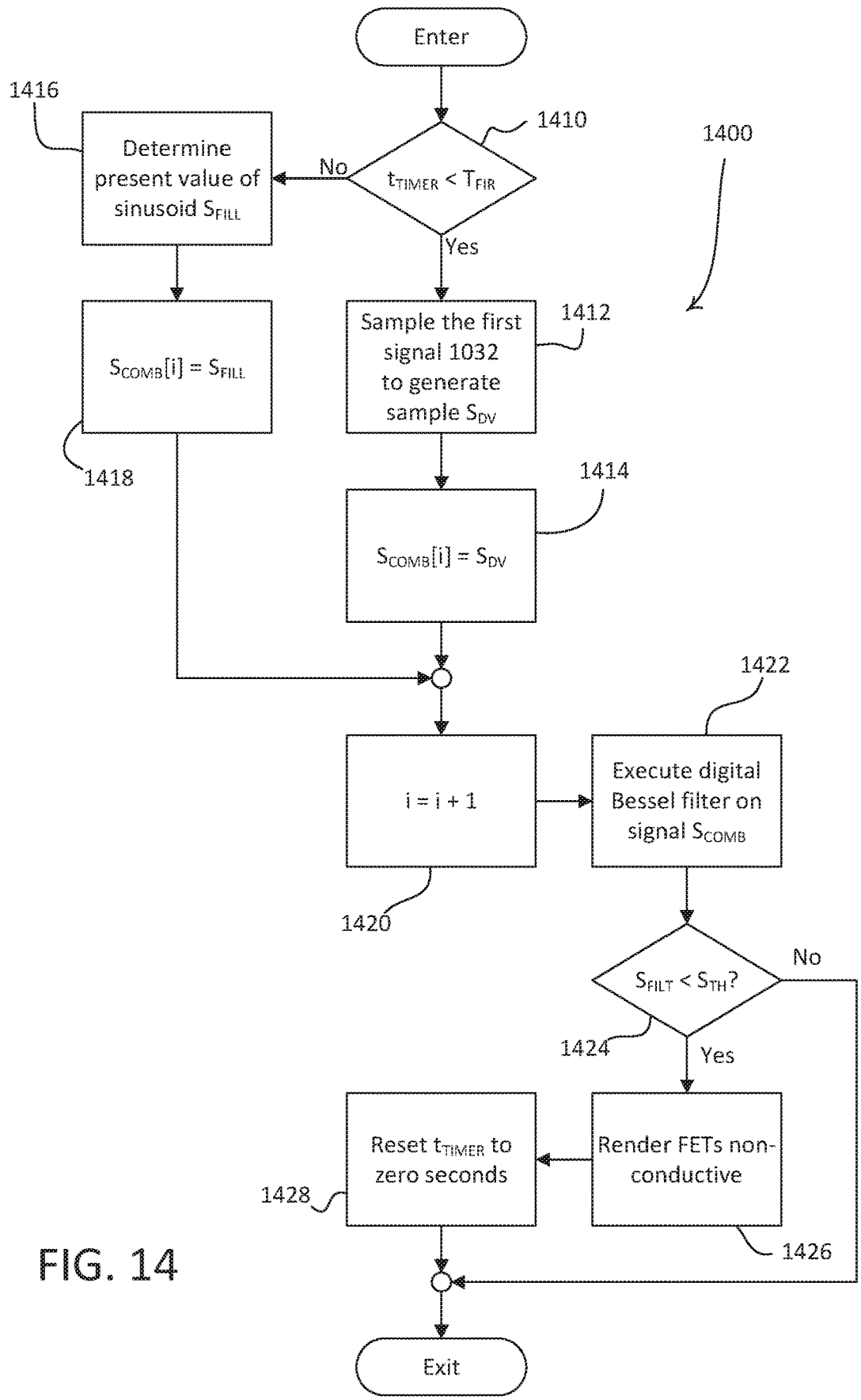
FIG. 14 is a simplified schematic diagram of a sampling procedure executed periodically by a control circuit of the lighting control device of FIG. 13.

FIG. 14 is a simplified schematic diagram of a sampling procedure 1400 that is executed periodically (e.g., at a sampling rate) by a control circuit (e.g., the control circuit 1320 of the lighting control device 1300) in order to sample and process the first signal 1032. The control circuit 1320 uses a timer to keep track of the present time during each half-cycle. The timer increases in value with respect to time and is reset at the beginning of each half-cycle. The control circuit 1320 is operable to render the controllably conductive device conductive when a value $t_{TIMER}$ of the timer reaches the firing time $T_{FIR}$ that is stored in memory. Referring to FIG. 14, if the value $t_{TIMER}$ of the timer is less than the firing time $T_{FIR}$ at step 1410, the control circuit 1320 samples the first signal 1032 at step 1412 to generate a sample Soy that is representative of the instantaneous value of the dimmer-voltage waveform across the controllably conductive device. The control circuit 1320 then stores the sample Soy as the next value of the digital combined signals $S_{COMB}[i]$ at step 1414. If the value $t_{TIMER}$ of the timer is less than the firing time $T_{FIR}$ at step 1410, the control circuit 1320 determines the present value of a fill signal $S_{FILL}$ at step 1416, for example, using a lookup table, and then stores the present value of the fill signal $S_{FILL}$ as the next value of the digital combined signals $S_{COMB}[i]$ at step 1418. The control circuit 1320 then increments the variable i by one at step 1420 and executes the digital Bessel filter on the digital combined signal $S_{COMB}$ at step 1422. If the filtered signal $S_{FILT}$ is not less than a signal threshold $S_{TH}$ at step 1424, the sampling procedure 1400 simply exits. However, if the filtered signal $S_{FILT}$ is less than the signal threshold $S_{TH}$ at step 1424 (i.e., indicating a zero-crossing), the control circuit 1320 renders the FETs 1010, 1012 non-conductive at step 1426 and resets the value $t_{TIMER}$ of the timer to zero seconds at step 1428, before the sampling procedure 1400 exits.

What is claimed is:

1. A dimmer switch, comprising:
   a controllably conductive device for supplying an AC line voltage to a load in response to a drive signal, wherein the controllably conductive device is non-conductive for a first duration of time and is conductive for a second duration of time, wherein the first duration of time and the second duration of time are within a same half-cycle of the AC line voltage;
   a power supply configured to conduct a charging current through the load to generate a supply voltage for powering one or more components of the dimmer switch; and
   a control circuit configured to:
      receive a signal from the controllably conductive device that represents a voltage developed across the controllably conductive device during the first duration of time;
      generate a fill signal that complements the signal received from the controllably conductive device during the second duration of time;
      combine the signal received from the controllably conductive device and the fill signal to produce a combined signal; and
      filter the combined signal by filtering the signal received from the controllably conductive device during the first duration of time and filtering the fill signal during the second duration of time.

2. The dimmer switch of claim 1, wherein the fill signal comprises a sine-wave-shaped signal.

3. The dimmer switch of claim 2, wherein the sine-wave-shaped signal comprises a step-sine wave signal.

4. The dimmer switch of claim 3, wherein the step-sine wave signal comprises steps based on at least one pulse-width modulated signal.

5. The dimmer switch of claim 3, wherein the step-sine wave signal comprises steps based on at least one phase correction corresponding to a zero-crossing detected by a zero-crossing detection circuit.

6. The dimmer switch of claim 2, wherein the sine-wave-shaped signal is shaped such that delay associated with filtering the signal received from the controllably conductive device during the first duration of time and filtering the fill signal during the second duration of time is consistent with delay associated with filtering the AC line voltage.

7. The dimmer switch of claim 1, wherein the control circuit comprises:
   a signal generator configured to generate the fill signal;
   a combiner circuit configured to combine the signal received from the controllably conductive device and the fill signal; and
   a filter circuit configured to filter the combined signal.

8. The dimmer switch of claim 7, wherein the combiner circuit comprises a switch configured to switch between the signal received from the controllably conductive device and the fill signal based on the drive signal, the switch configured to select the signal received from the controllably conductive device during the first duration of time and the fill signal during the second duration of time.

9. The dimmer switch of claim 8, wherein the switch comprises a multiplexer that switches in concert with the drive signal.

10. The dimmer switch of claim 7, wherein the filter circuit comprises a lowpass filter.

11. The dimmer switch of claim 10, wherein the low-pass filter provides a substantially linear phase delay of less than one-half of a period of the fundamental frequency and attenuates frequency components of the combined signal that are substantially equal to third order harmonics and greater of the fundamental frequency.

12. The dimmer switch of claim 1, wherein the control circuit is further configured to sample the signal received from the controllably conductive device during the first duration of time.

13. The dimmer switch of claim 12, wherein the control circuit is configured to filter the combined signal using a digital Bessel filter.

14. The dimmer switch of claim 1, wherein the control circuit is configured to:
   generate a filtered signal in response to filtering the combined signal; and
   determine a zero-crossing of the AC line voltage based on the filtered signal.

15. The dimmer switch of claim 14, wherein the control circuit is configured to generate the drive signal to control the controllably conductive device based on the determined zero-crossing of the AC line voltage.

16. The dimmer switch of claim 1, wherein the fill signal is shaped such that delay associated with filtering the signal from the controllably conductive device during the first duration of time and the sine-wave-shaped signal during the second duration of time is consistent with delay associated with filtering the AC line voltage.

17. A method for controlling an electrical load, the method comprising:
   receiving a signal from a controllably conductive device that represents a voltage developed across the controllably conductive device during a first duration of time, wherein the controllably conductive device is configured to supply an AC line voltage to the electrical load in response to a drive signal and the drive signal is configured to render the controllably conductive device non-conductive during the first duration of time;
   generating a sine-wave-shaped signal that complements the signal received from the controllably conductive device during a second duration of time, wherein the first duration of time and the second duration of time are within a same half-cycle of the AC line voltage and the drive signal is configured to render the controllably conductive device conductive during the second duration of time;
   combining the signal received from the controllably conductive device and the sine-wave-shaped signal to produce a combined signal; and
   filtering the combined signal by filtering the signal received from the controllably conductive device during the first duration of time and filtering the sine-wave-shaped signal during the second duration of time.

18. The method of claim 17, further comprising:
   generating a filtered signal in response to filtering the combined signal; and
   determining a zero-crossing of the AC line voltage based on the filtered signal.

19. The method of claim 18, further comprising:
   generating the drive signal to control the controllably conductive device based on the determined zero-crossing of the AC line voltage.

20. The method of claim 17, wherein the sine-wave-shaped signal is shaped such that delay associated with filtering the signal from the controllably conductive device during the first duration of time and the sine-wave-shaped signal during the second duration of time is consistent with delay associated with filtering the AC line voltage.

21. The method of claim 17, wherein combining the signal received from the controllably conductive device and the sine-wave-shaped signal comprises selecting the signal received from the controllably conductive device during the first duration of time and the sinewave-shaped signal during the second duration of time.

* * * * *